Figure 1:
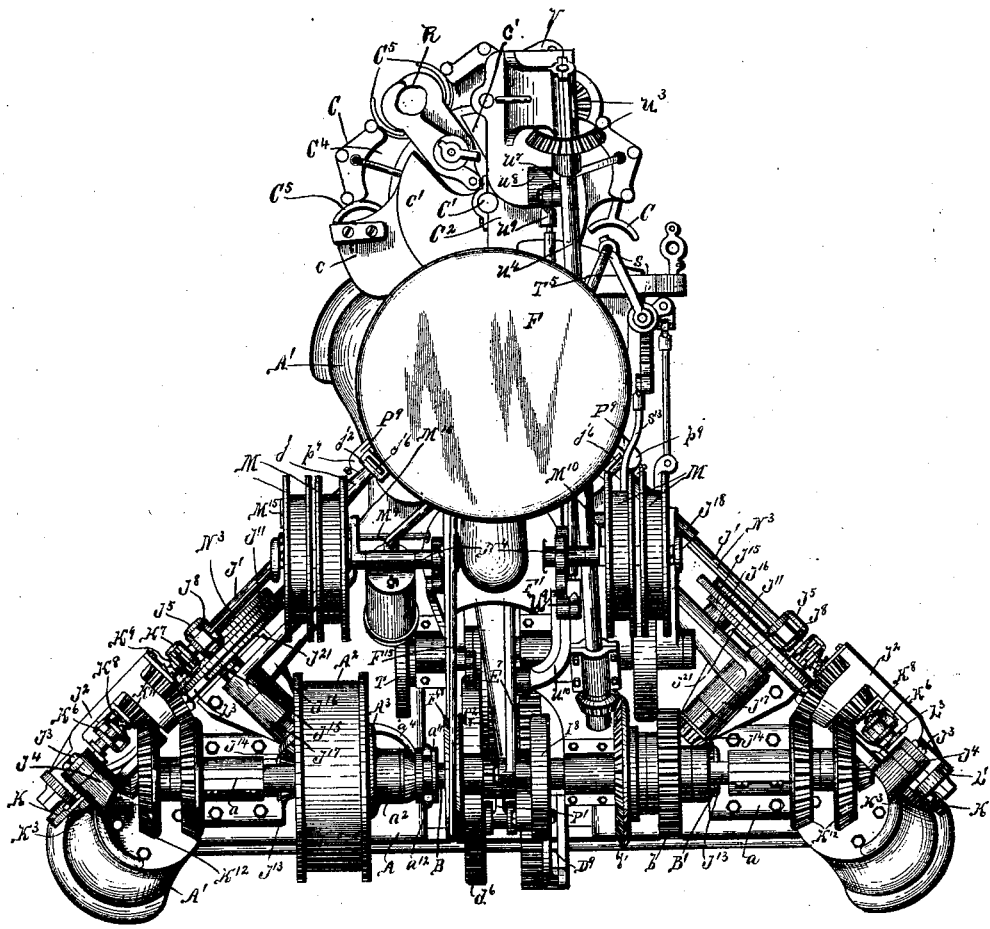

(No Model.) 17 Sheets—Sheet 1.

S. WILE & H. LA CASSE.
BOTTLE WIRING MACHINE.

No. 479,342. Patented July 19, 1892.

WITNESSES:

INVENTORS

ATTORNEYS (No Model.) 17 Sheets—Sheet 2.

S. WILE & H. LA CASSE.
BOTTLE WIRING MACHINE.

No. 479,342. Patented July 19, 1892.

WITNESSES:

INVENTORS
Sol Wile
Henry La Casse
BY
Wilkinson & Parsons
ATTORNEYS.

(No Model.) 17 Sheets—Sheet 4.

S. WILE & H. LA CASSE.
BOTTLE WIRING MACHINE.

No. 479,342. Patented July 19, 1892.

WITNESSES:
H. E. Chase
W. H. Randall

INVENTORS
Sol Wile
Henry La Casse
BY
ATTORNEYS (No Model.) 17 Sheets—Sheet 5.

S. WILE & H. LA CASSE.
BOTTLE WIRING MACHINE.

No. 479,342. Patented July 19, 1892.

WITNESSES:

INVENTORS:

ATTORNEYS.

(No Model.)  17 Sheets—Sheet 6.

S. WILE & H. LA CASSE.
BOTTLE WIRING MACHINE.

No. 479,342.  Patented July 19, 1892.

Witnesses.
Inventors.

(No Model.) 17 Sheets—Sheet 7.
S. WILE & H. LA CASSE.
BOTTLE WIRING MACHINE.
No. 479,342. Patented July 19, 1892.
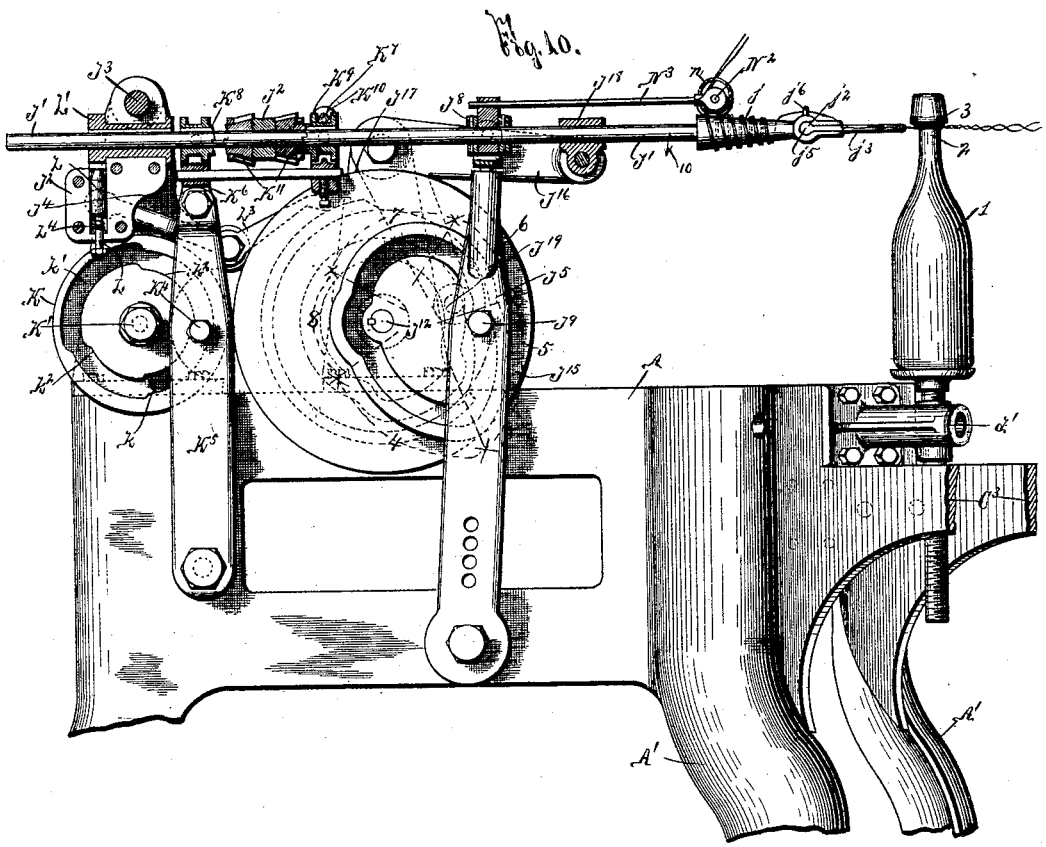

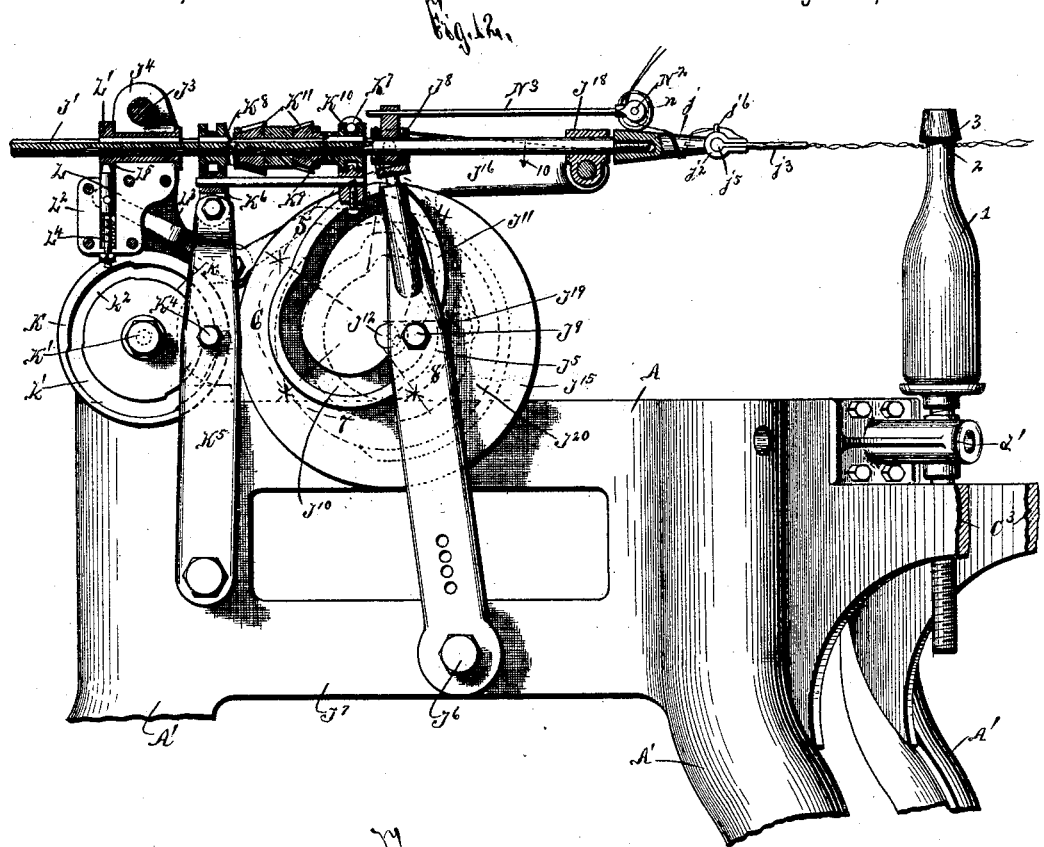

(No Model.) 17 Sheets—Sheet 9.
S. WILE & H. LA CASSE.
BOTTLE WIRING MACHINE.
No. 479,342. Patented July 19, 1892.
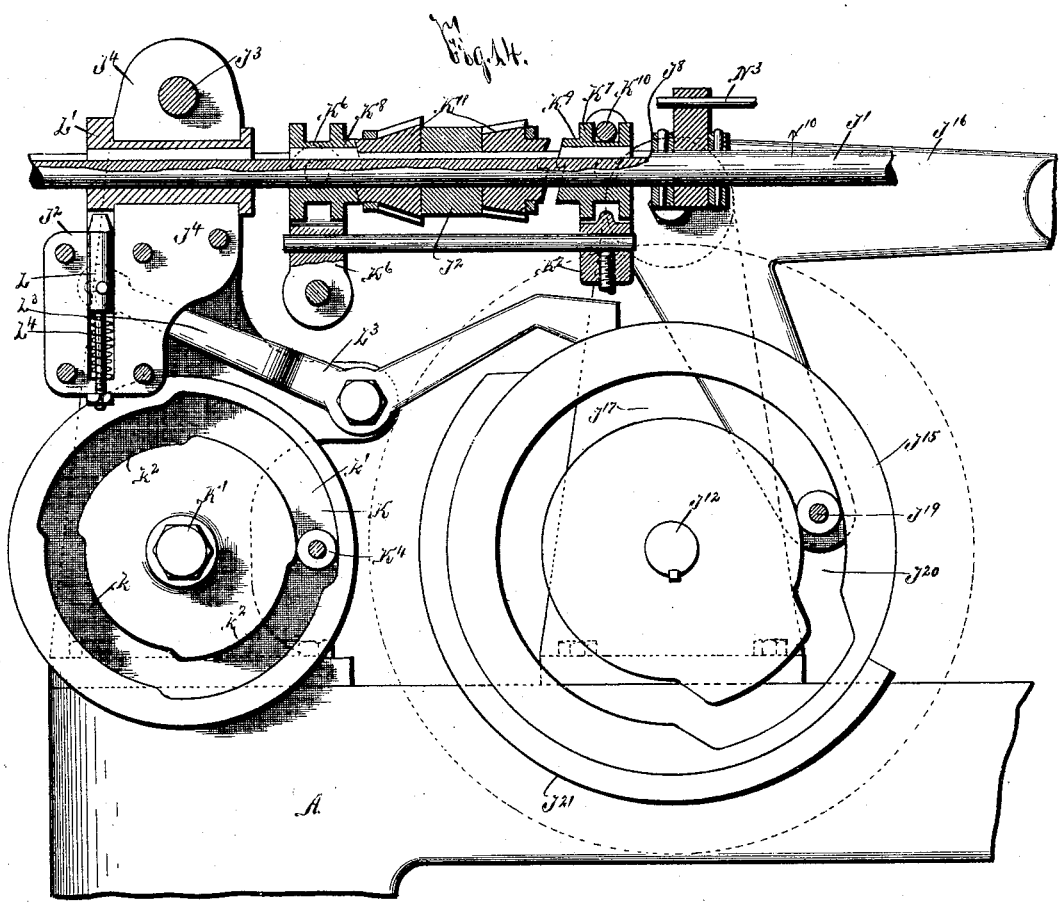
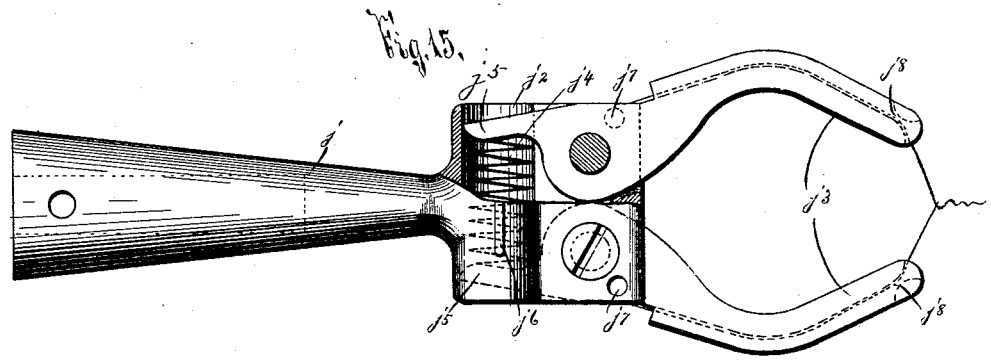
Witnesses.
H. E. Chase
W. H. Randall
Inventors.
Sol Wile
Henry La Casse
by
Wilkinson Fisher
Attorneys.

(No Model.)   17 Sheets—Sheet 10.
S. WILE & H. LA CASSE.
BOTTLE WIRING MACHINE.
No. 479,342. Patented July 19, 1892.
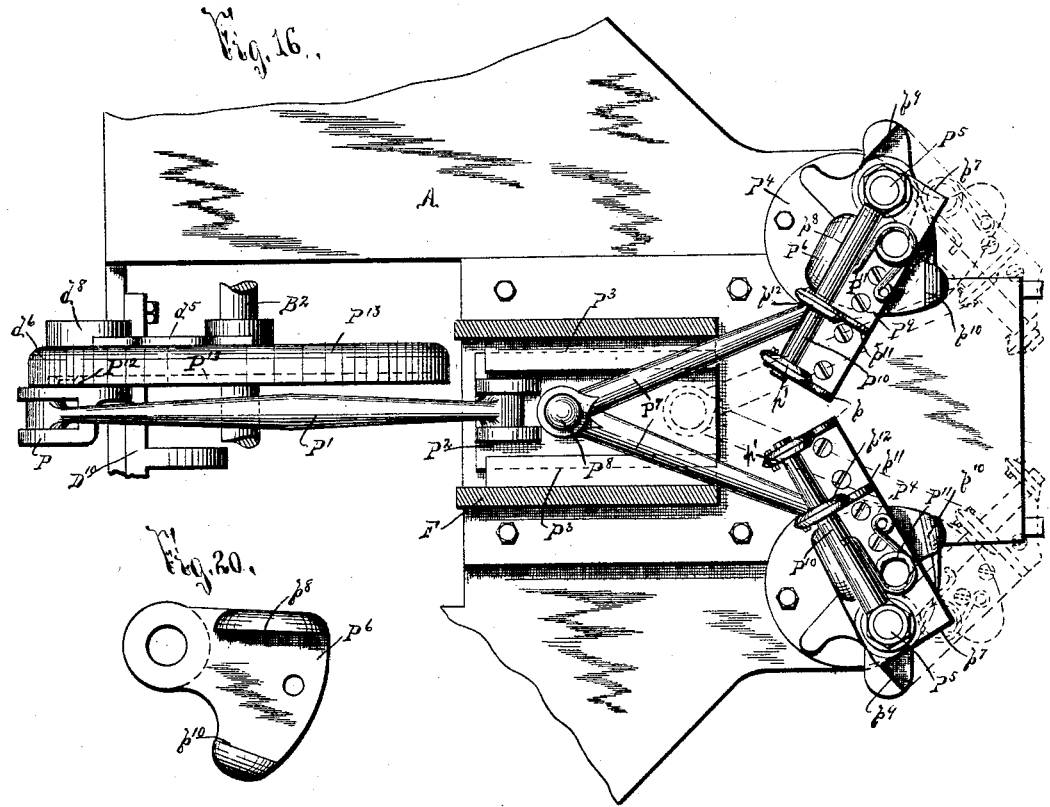
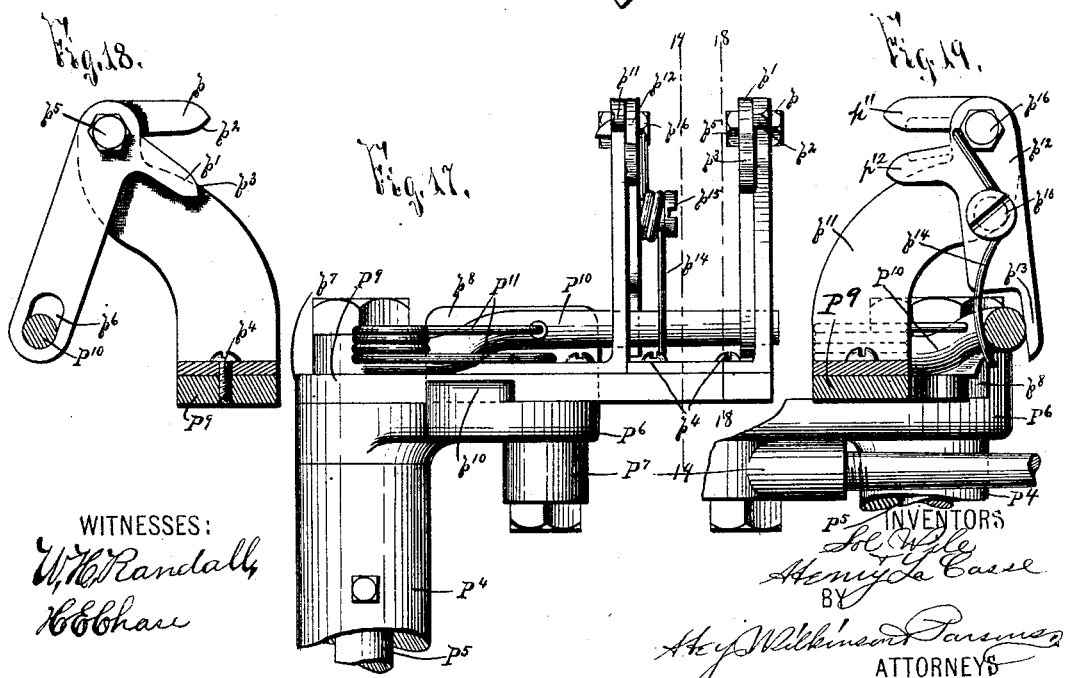
WITNESSES:
INVENTORS
ATTORNEYS (No Model.) 17 Sheets—Sheet 11.
S. WILE & H. LA CASSE.
BOTTLE WIRING MACHINE.
No. 479,342. Patented July 19, 1892.
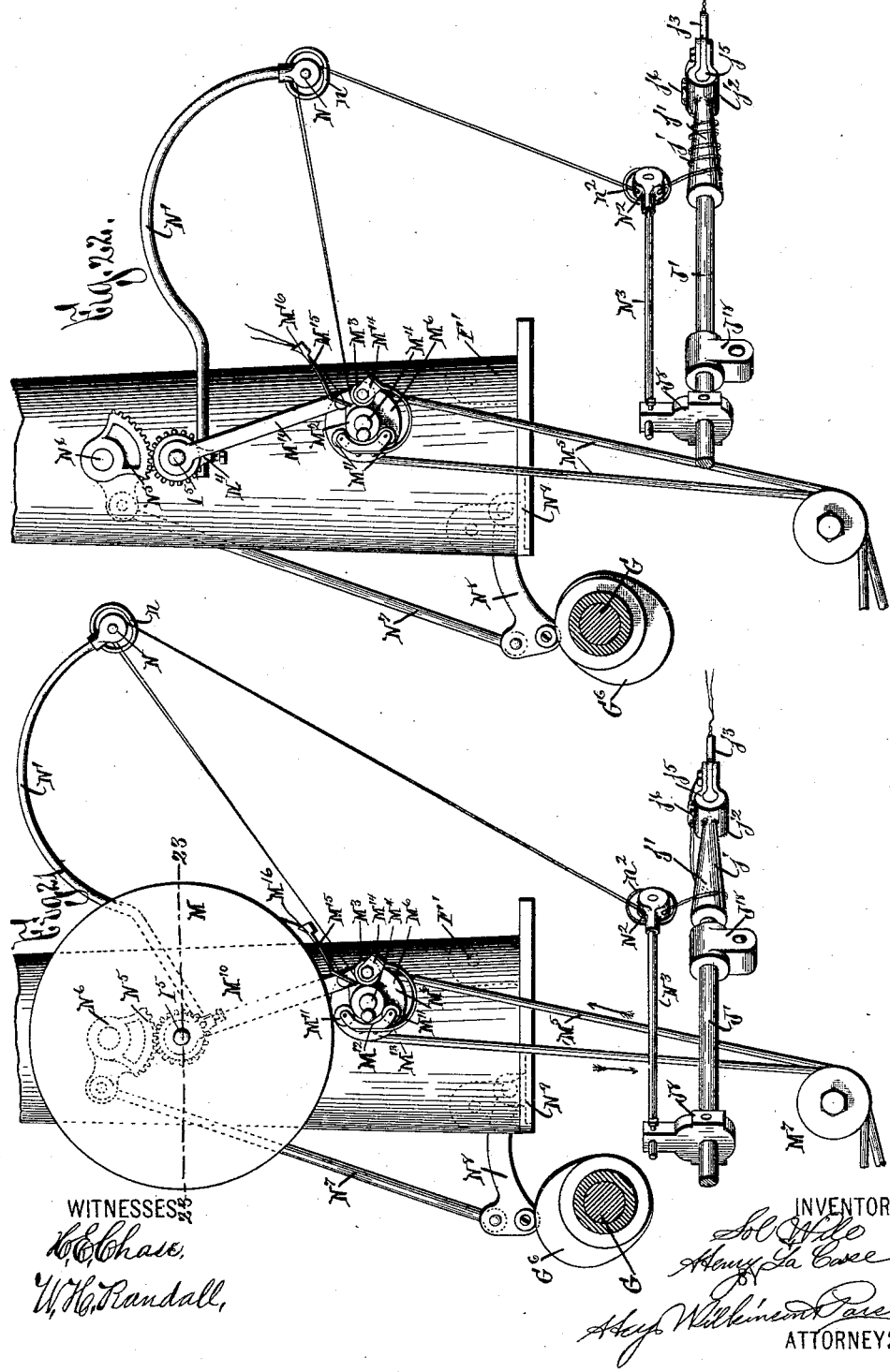
WITNESSES
K. C. Chase,
W. H. Randall,
INVENTORS
Sol Wile
Henry La Casse
Hugh Wilkinson Parsons
ATTORNEYS

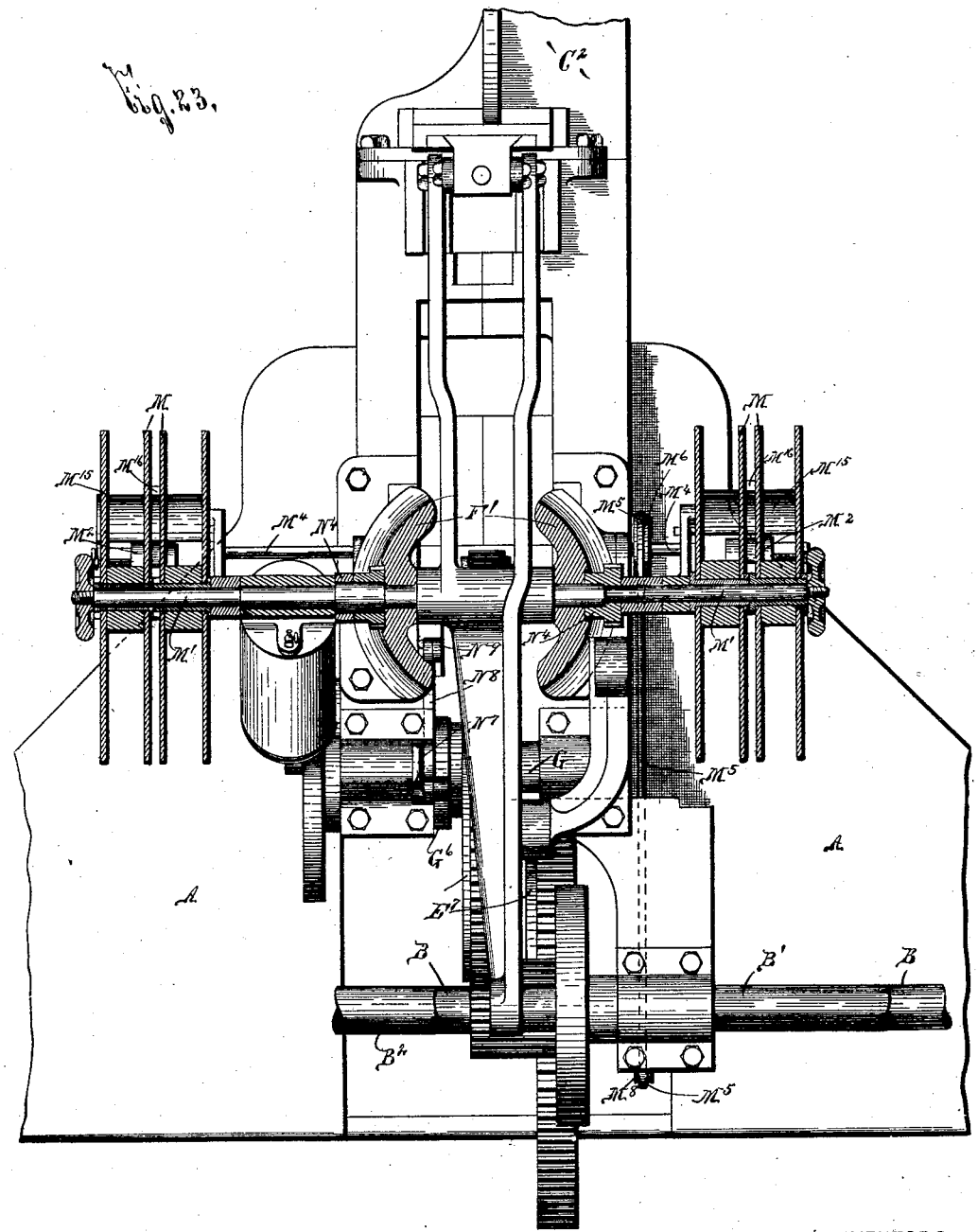

(No Model.) 17 Sheets—Sheet 13.
S. WILE & H. LA CASSE.
BOTTLE WIRING MACHINE.
No. 479,342. Patented July 19, 1892.
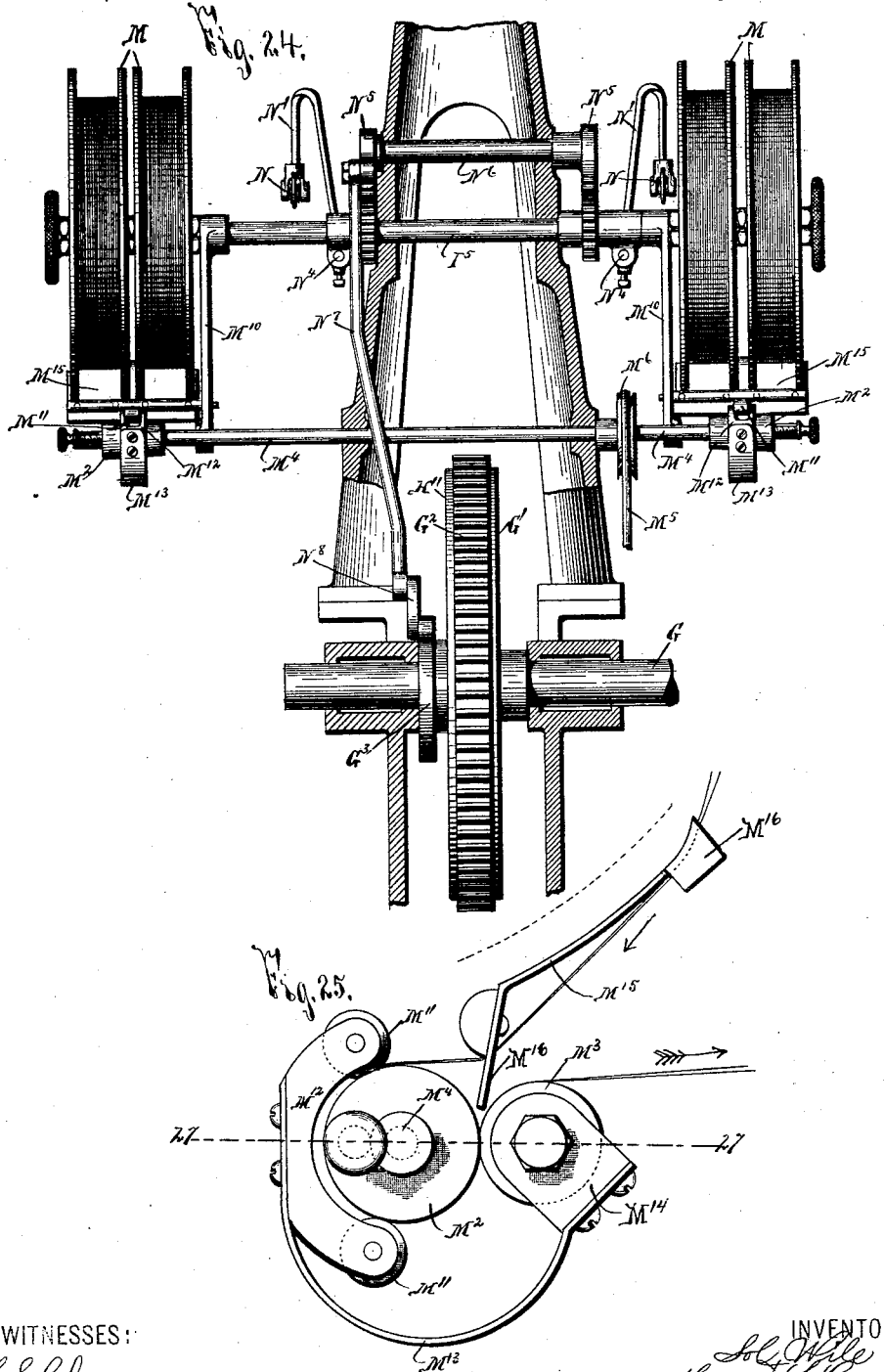
WITNESSES:
H. E. Chase
W. H. Randall
INVENTORS
Sol. Wile
Henry La Casse
BY
Hey Wilkinson Parsons
ATTORNEYS (No Model.) 17 Sheets—Sheet 14.
S. WILE & H. LA CASSE.
BOTTLE WIRING MACHINE.
No. 479,342. Patented July 19, 1892.
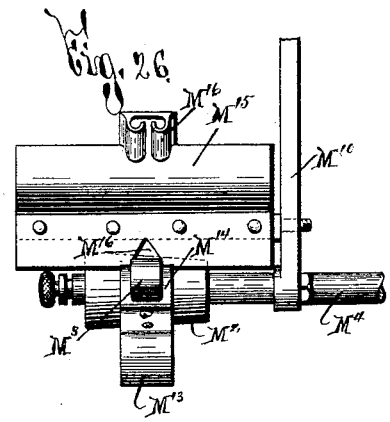
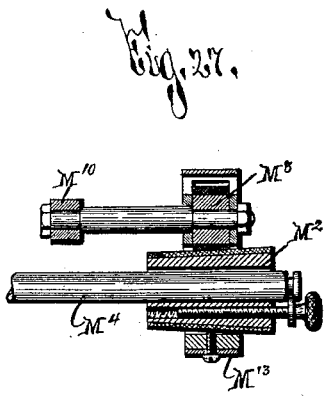
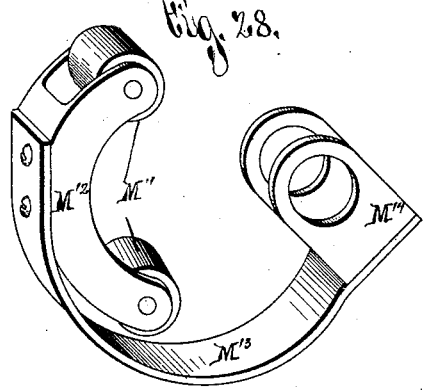
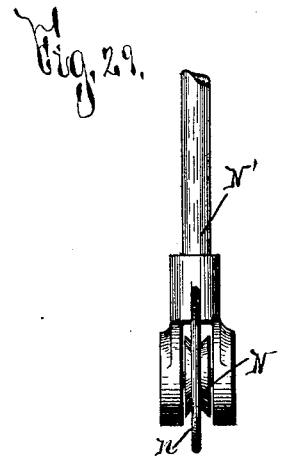
WITNESSES:
INVENTORS
ATTORNEYS (No Model.) 17 Sheets—Sheet 15.
S. WILE & H. LA CASSE.
BOTTLE WIRING MACHINE.
No. 479,342. Patented July 19, 1892.
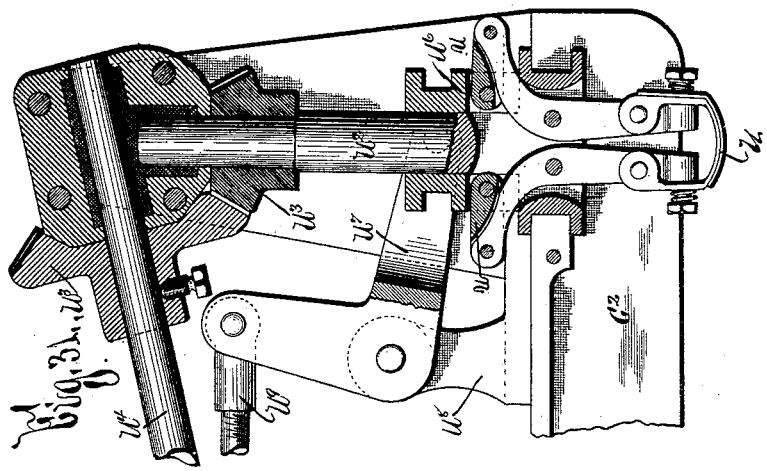
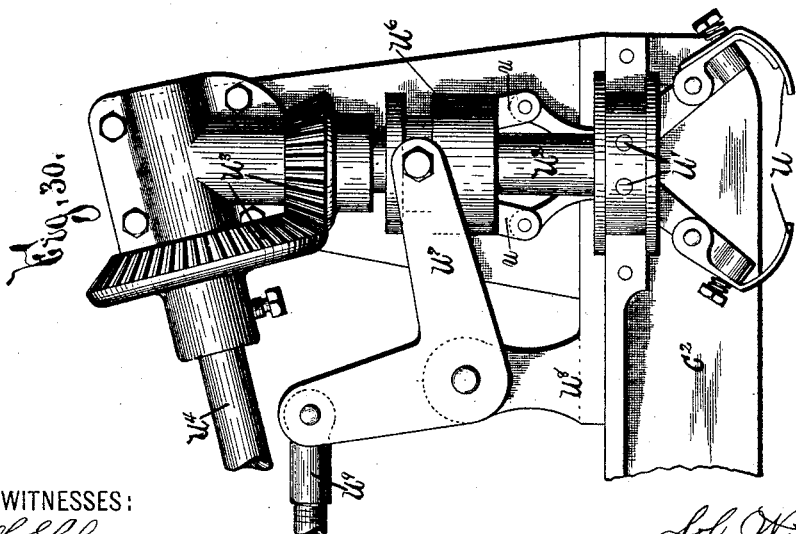

(No Model.)  17 Sheets—Sheet 16.

S. WILE & H. LA CASSE.
BOTTLE WIRING MACHINE.

No. 479,342. Patented July 19, 1892.

WITNESSES:
H. E. Chase,
W. H. Randall

INVENTORS
Sol Wile
Henry LaCasse
BY
Wilkinson & Parsons
ATTORNEYS.

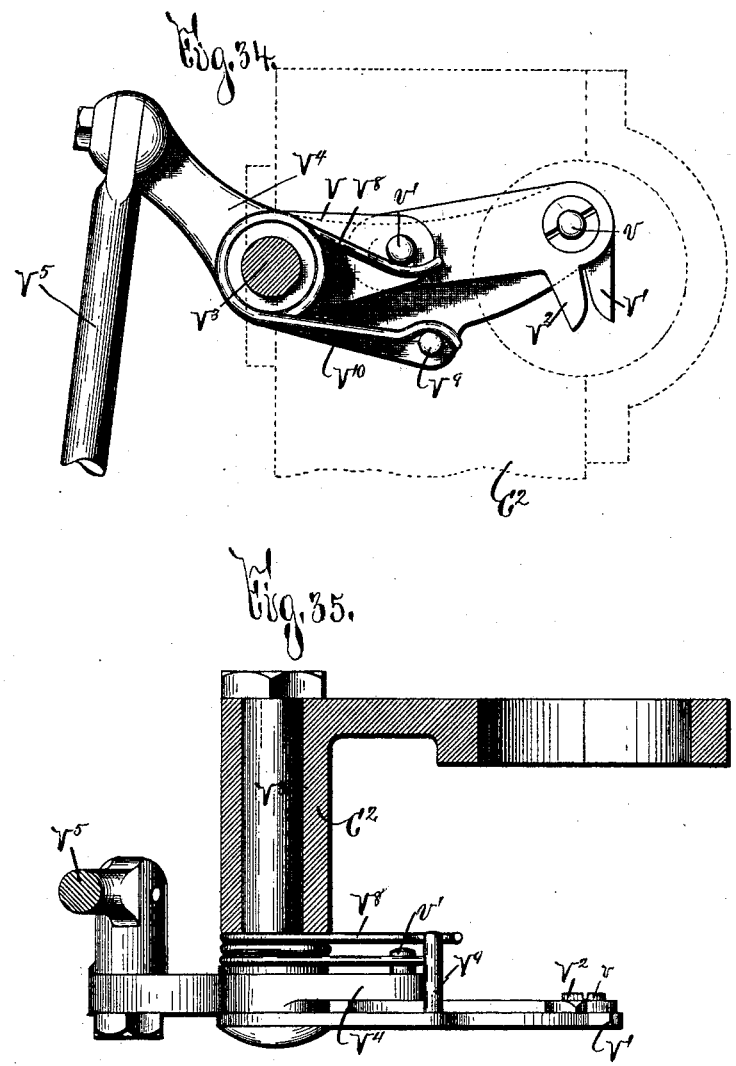

UNITED STATES PATENT OFFICE.

SOL WILE AND HENRY LA CASSE, OF ROCHESTER, NEW YORK, ASSIGNORS TO THE BOTTLERS' SPECIALTY COMPANY, OF SAME PLACE.

BOTTLE-WIRING MACHINE.

SPECIFICATION forming part of Letters Patent No. 479,342, dated July 19, 1892.

Application filed December 24, 1890. Serial No. 375,735. (No model.)

*To all whom it may concern:*

Be it known that we, SOL WILE and HENRY LA CASSE, of Rochester, in the county of Monroe, in the State of New York, have invented new and useful Improvements in Bottle-Wiring Machines, of which the following, taken in connection with the accompanying drawings, is a full, clear, and exact description.

Our invention relates to improvements in bottle-wiring machines, and has for its object the production of a simple and effective device for rapidly and automatically securing strands of wire to the bottle and over the inserted cork for retaining the same in position; and to this end the invention consists, essentially, in a reversely-revoluble spindle for receiving the strands of wire and a pair of jaws for receiving the wire from the spindle and securing it to the bottle.

The invention furthermore consists in a pair of spindles arranged at an angle with each other, and connected mechanism between the spindles whereby they are reciprocated toward and away from the bottle and are reversely rotated to receive and feed out the wire in a continuous wire-feeder for feeding the wire to the spindle, and a take-up for preventing slack of the wire.

The invention furthermore consists in the detail construction and arrangement of the parts, all as hereinafter more particularly described, and pointed out in the claims.

In describing this invention reference is had to the accompanying drawings, forming a part of this specification, in which like letters and figures indicate corresponding parts in all the views.

Figure 2:
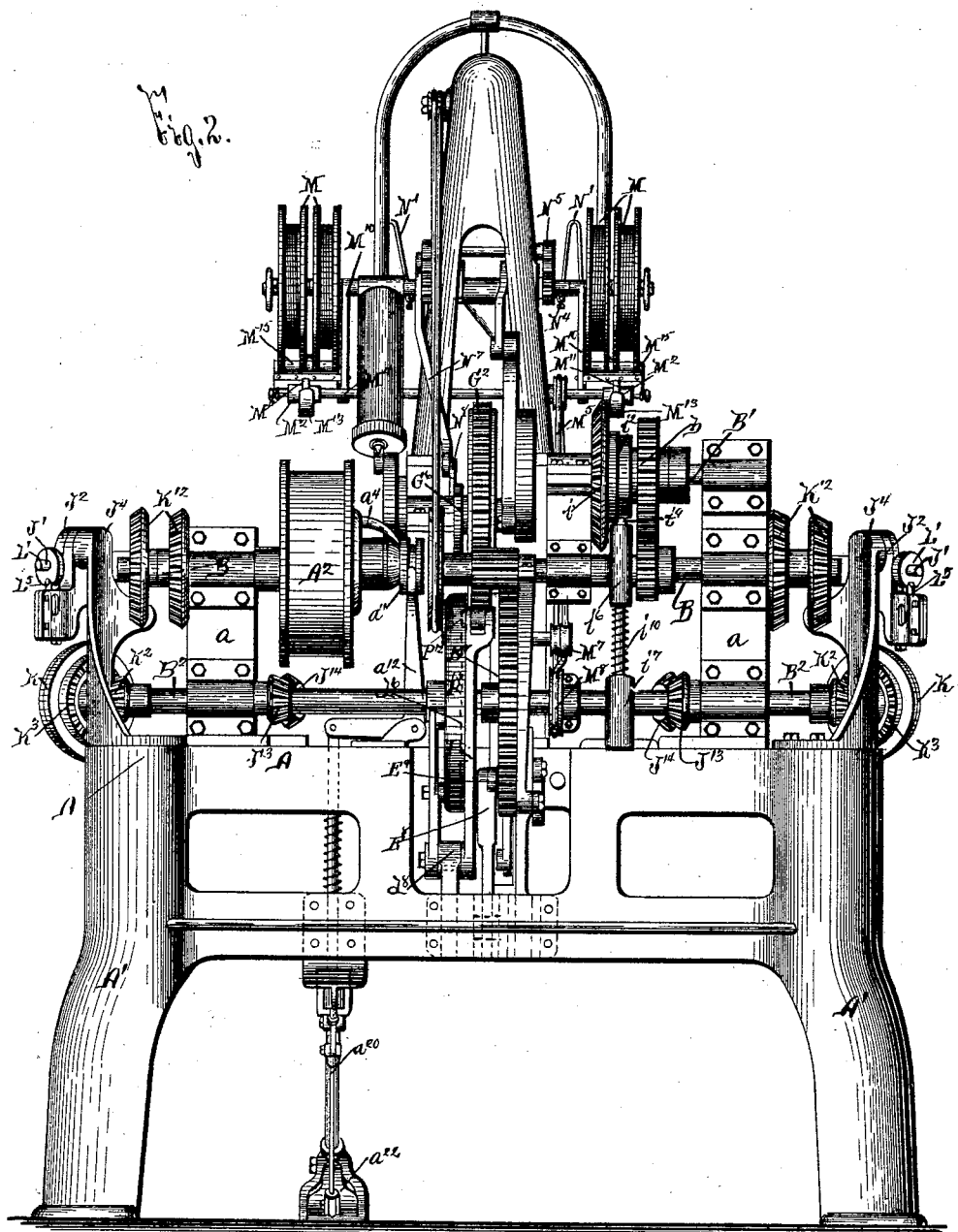
Figure 3:
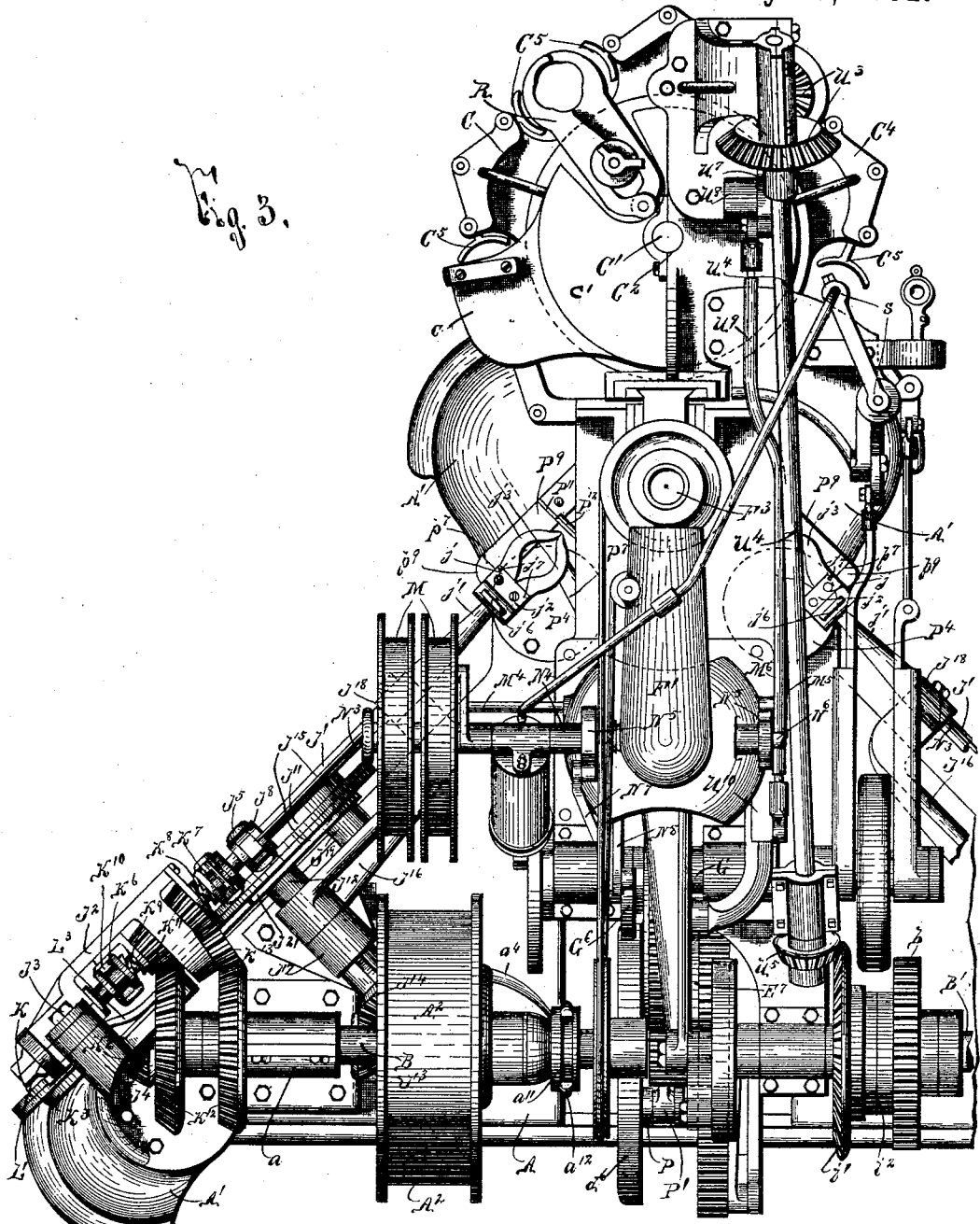
Figure 4:
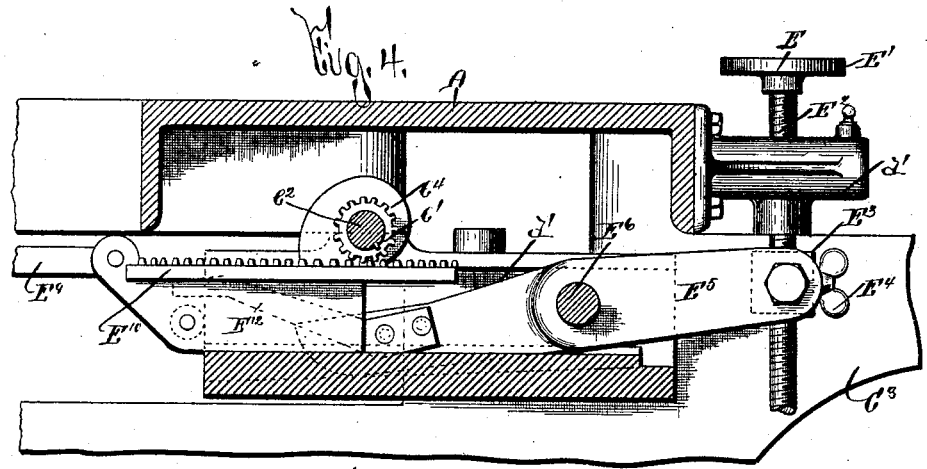
Figure 5:
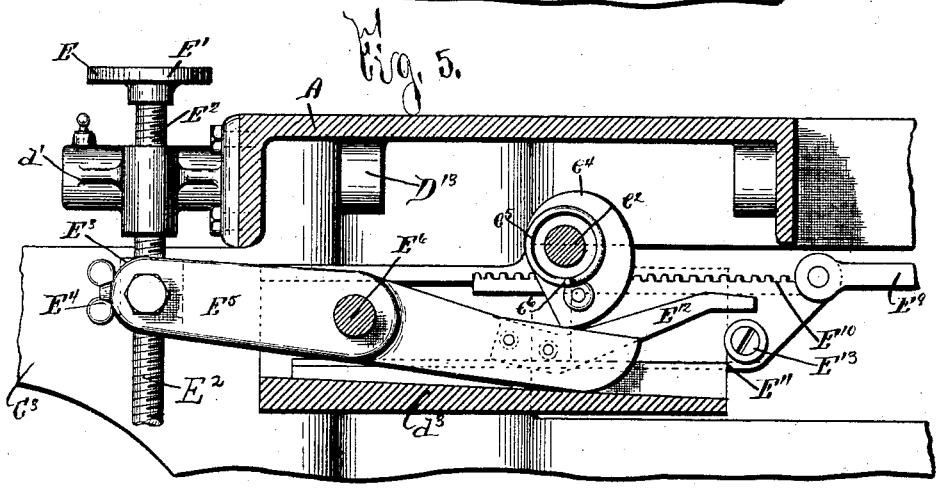
Figure 6:
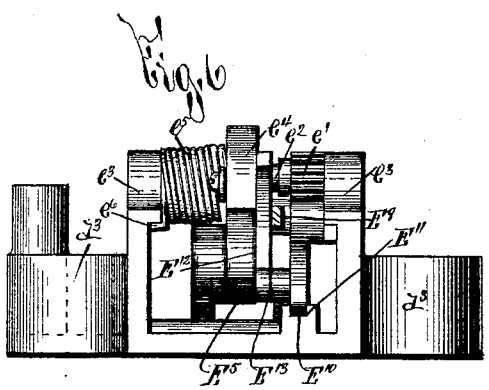
Figure 7:
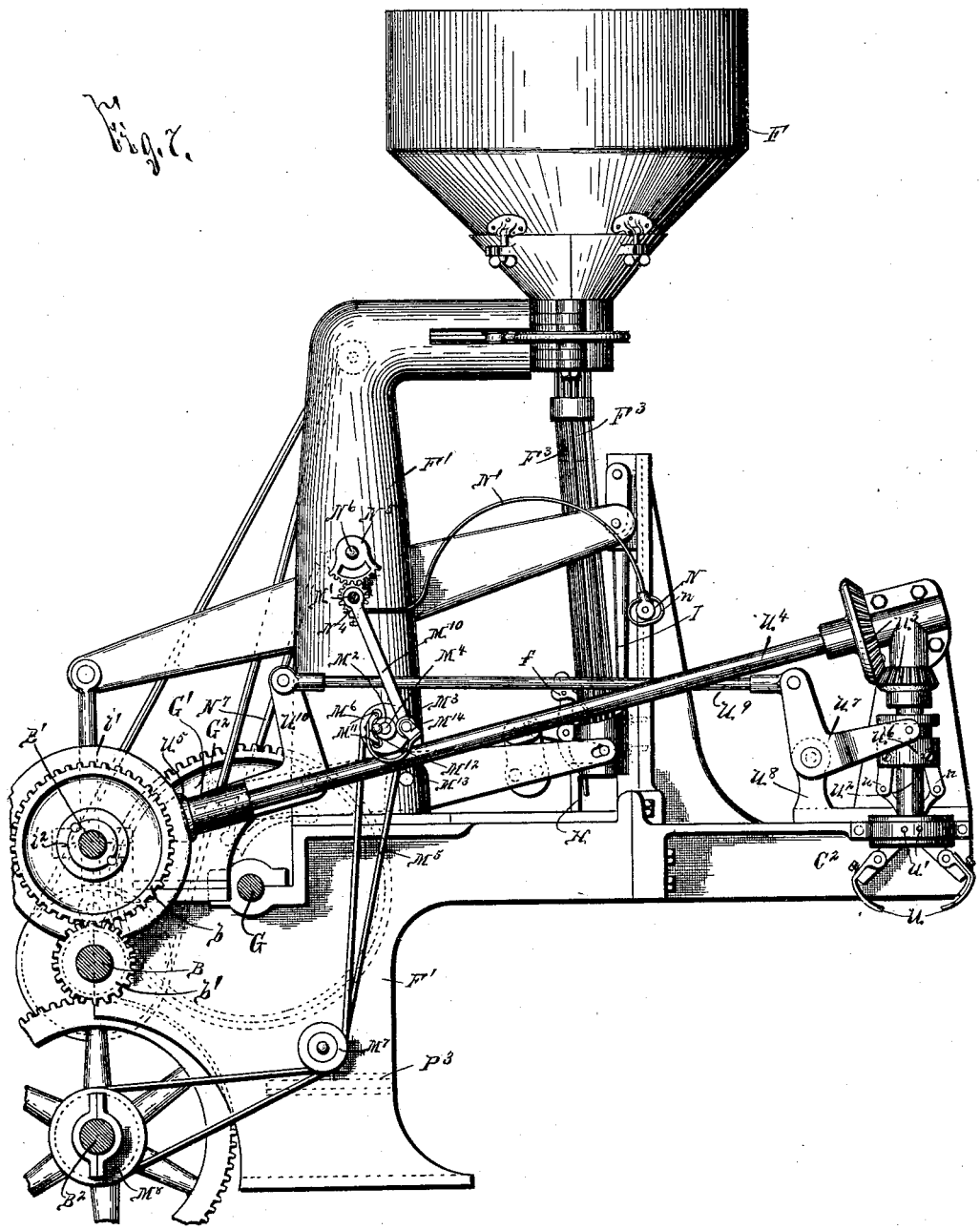
Figure 8:
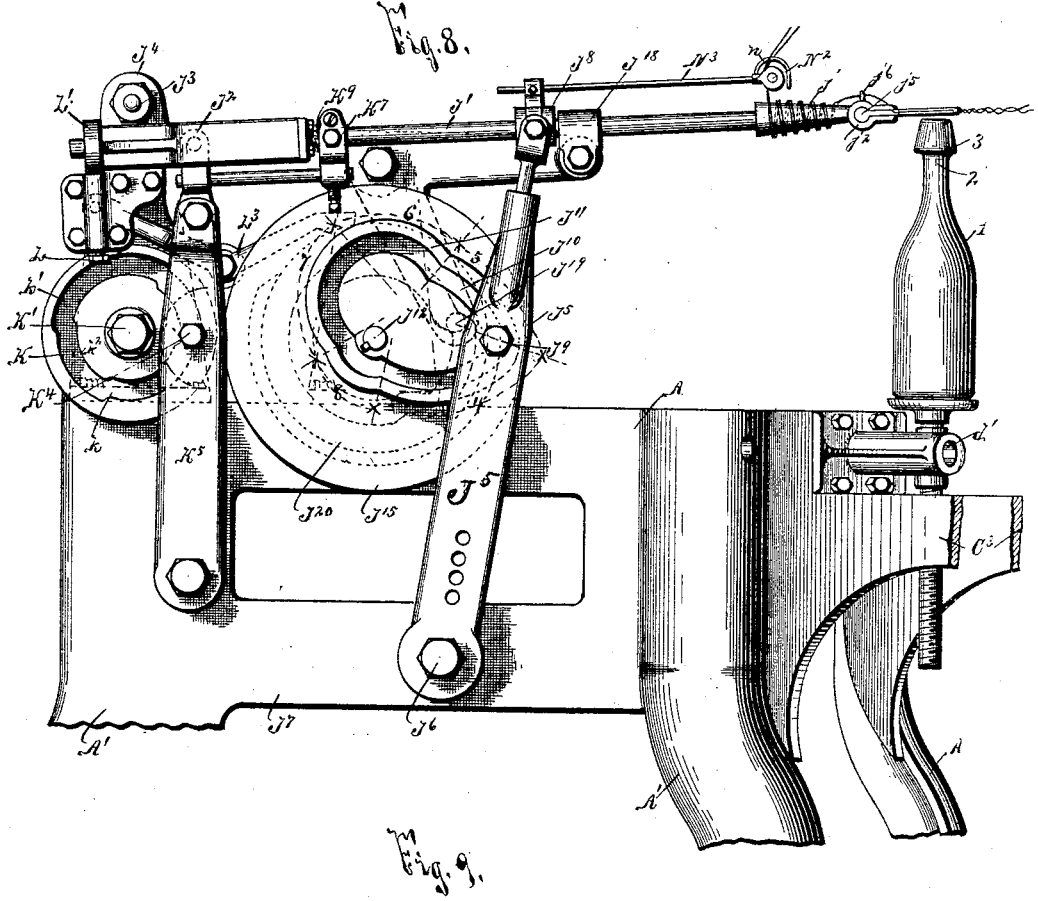
Figure 9:
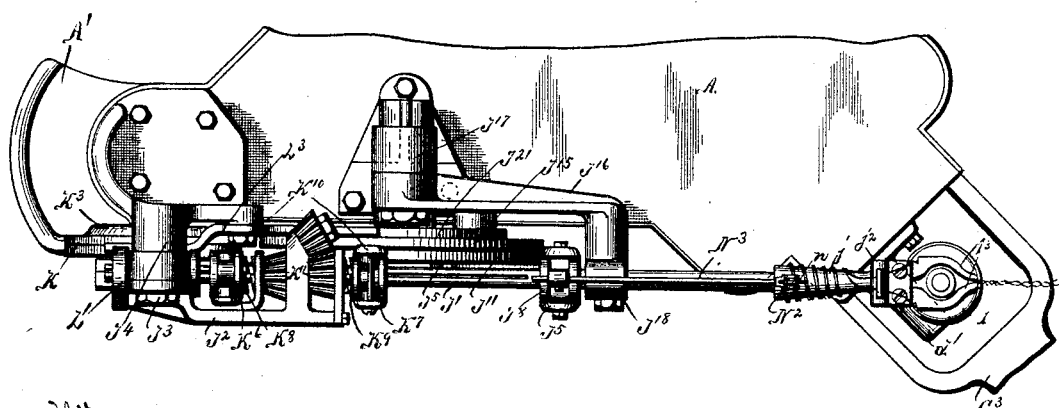
Figure 32:
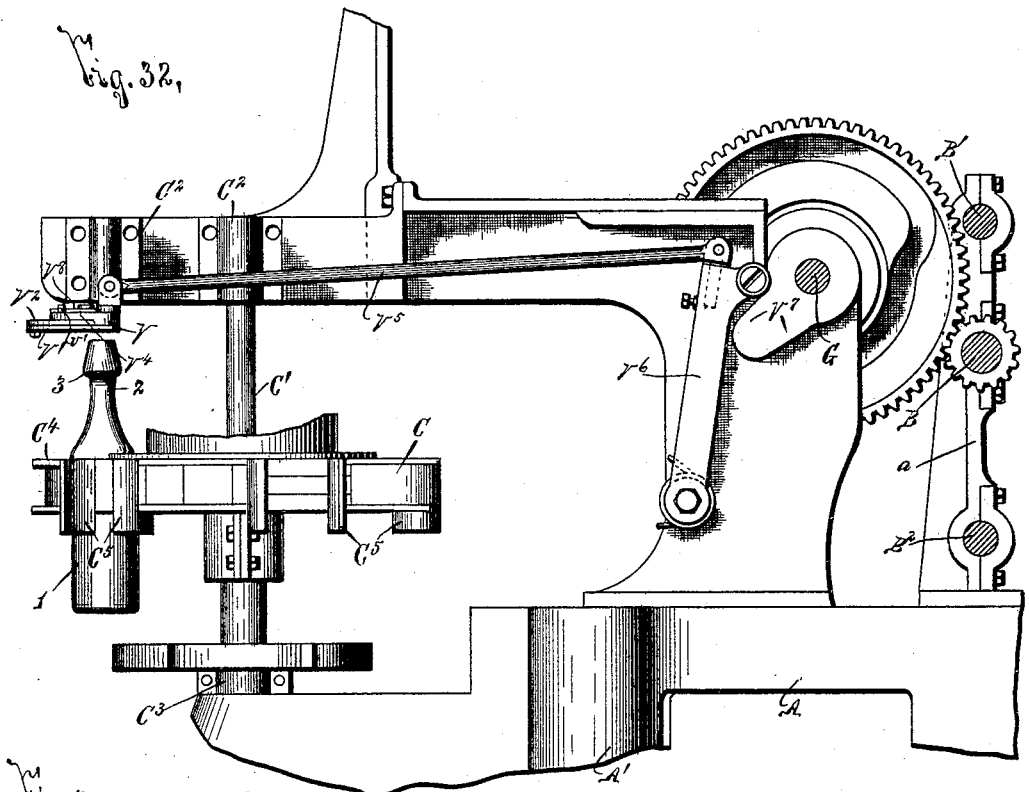
Figure 33:
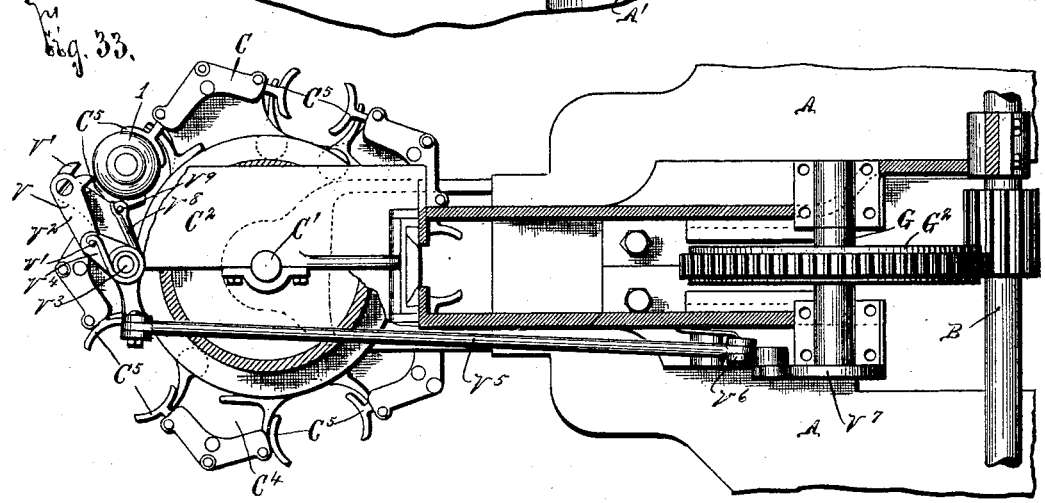

Figures 1 and 2 are respectively a top plan view and a side elevation of our improved invention shown as operatively connected to the various other parts of our improved bottling-machine shown, described, and claimed in our application, Serial No. 376,429, filed December 31, 1890. Fig. 3 is an enlarged plan view similar to Fig. 1, with a portion of the parts shown in said figure broken away for the purpose of further illustrating our invention. Figs. 4 and 5 are elevations taken upon opposite sides of the mechanism for raising and elevating the bottle-support upon which the bottles are supported while the wire is being secured thereto. Fig. 6 is an end view of the parts as illustrated in Figs. 4 and 5. Fig. 7 is an elevation of our invention having the wire-securing mechanism detached for the purpose of further illustrating the remaining parts. Figs. 8 and 9 are respectively a side elevation and a top plan view of the wire-securing mechanism, illustrating the wire-securing jaws as in their position assumed when aligned with the bottle. Figs. 10 and 11 are respectively front and rear elevations, partly in section, of the wire-securing mechanism, the wire-securing jaws being shown in their position assumed after the wire has been secured to the bottle and the jaws depressed beneath the top of the bottle. Fig. 12 is a similar view to Fig. 10, illustrating the wire-securing jaws as in their rearward position, assumed after spinning the required amount of wire. Fig. 13 is an enlarged top plan view of the parts as illustrated in Fig. 12, section being used to show some of the parts more clearly. Fig. 14 is an enlarged rear elevation, partly in section, of a portion of the actuating mechanism for the wire-shuttle. Fig. 15 is an enlarged plan view, partly in section, of the wire-feeding spindle and wire-securing jaws. Fig. 16 is a top plan view of the wire-cutting mechanism for severing the strands of wire after their opposite extremities are twisted together. Fig. 17 is a front elevation of one set of the wire cutting and holding jaws of the cutting mechanism shown in Fig. 16. Figs. 18 and 19 are sectional views taken, respectively, on lines 18 18 and 19 19 of Fig. 17. Fig. 20 is a detail view of an actuating-lever of the wire-cutting mechanism. Figs. 21 and 22 are elevations of the wire-feeding spindle, the feeder or primary wire-feeding device, and the take-up plate. Fig. 23 is a horizontal sectional view taken on line 23 23, Fig. 21. Fig. 24 is an enlarged rear elevation of the primary wire-feeding device and the take-up levers. Fig. 25 is an enlarged side elevation of the wire-feeding rollers and guides for yielding the wire toward and away from said rollers. Fig. 26 is a front elevation of the parts as illustrated in Fig. 25. Fig. 27 is a sectional view taken on line 27 27 of Fig. 25. Fig. 28 is an isometric perspective of the yielding guide for the wire-feeding mechanism. Fig. 29 is a front elevation of the end of the take-up lever, illustrating particularly the guide for operating the separate strands of wire. Figs. 30 and 31 are respectively a side elevation and a vertical sectional view of the final wire-twisting mechanism. Figs. 32 and 33 are respectively a side elevation and a top plan view of the final cutting mechanism; and Figs. 34 and 35 are respectively a top plan and a side elevation, partly in section, of the final cutter.

As stated in our application for an improved bottling-machine, Serial No. 376,429, filed December 31, 1890, great difficulty exists in wiring corks to bottles automatically and rapidly, in order that a single machine may have great capacity and operate automatically with a minimum amount of attendance.

In our previous patents, Nos. 443,185 and 443,194, both dated December 23, 1890, we have shown a wiring mechanism which reduced the escapement of the cork to a minimum, but did not permit of as great rapidity and certainty of operation as our present machine.

The wiring mechanism which forms the subject-matter of our present application is intended for use as previously stated in our aforesaid application for bottling-machines, and at Figs. 1, 3, and 7 we have shown operatively arranged and connected therewith a bottle-feed C, a cork-feeder F, a cork-conveying tube $F^3$, a cork cut-off $f$, a compressor H, a cork-inserter I, and a plate-feeding device $s$, all of which parts, it will be understood, are not essential to our present invention and may be either used or dispensed with, as desired.

The table A for our machine is of suitable size, form, and material, is mounted upon suitable legs or standards $A'$, and supports either upon its top or its standards the various elements or mechanisms of our invention— viz., a bottle feed or carrier, a bottle-support, primary wire-feeding mechanism, wire securing and twisting mechanism, cutters and holders, final twisting mechanism, and final cutters.

The motor-shaft B is supported in suitable brackets $a$, mounted on the table A, and power is communicated thereto by the loose pulley $A^2$. This pulley is adapted to be locked to the shaft by a clutch-dog $a^4$, a sliding clutch $a^{11}$, an actuating-lever $a^{12}$, a foot-piece $a^{22}$, and suitable connections $a^{20}$ between the lever and foot-piece. It is evident, however, that this mechanism for normally engaging and disengaging the pulley $A^2$ with the shaft B forms no part of our present invention, and a further description thereof is here unnecessary, since any desirable form of clutch mechanism may be used.

The carrier mechanism C is best seen in Figs. 1 and 3, and it preferably consists of a frame $C^4$, revoluble on a rod $C'$, supported in brackets $C^2$ and $C^3$, and provided with bottle-engaging arms $C^5$. This carrier may be of any desirable form and construction and may be rotated in any desirable manner by any construction of mechanism connected to our improved wiring mechanism. We do not, however, think it necessary to herein further illustrate or describe this carrier, since it is illustrated, described, and claimed in our aforesaid application for improvements in bottling-machines and since, if desired, the carrier may be entirely dispensed with and the bottles fed by hand to the bottle-support.

E represents the main bottle-support, Figs. 4 and 5, which is brought into contact with the base of the bottle in order to support it during the operation of the wire-securing mechanism. Before being aligned with the support E the tops of the bottles are first brought into contact with a gage $c$, suitably supported on the rod $C'$, for the purpose of bringing the tops of the bottles to a uniform plane. As preferably constructed, the bottle-support E is movable up and down, being provided with a depending screw-threaded shank $E^2$, which passes through a plain opening in the bracket $d'$ and through a screw-threaded opening in the nut $E^3$. The lever $E^5$, pivoted at $E^6$ beneath the top of the frame to a bracket $d^3$, supports the nut $E^3$ at its free extremity and is engaged at its opposite extremity by a cam $e^4$, which is mounted on a spindle $e^2$, journaled in the bracket $d^3$. Provided on the spindle $e^2$ is the pinion $e'$, which meshes with a rack $E^{10}$, that is reciprocated by a link $E^9$, connected to a lever $E^8$ at the rear of the machine. (See Fig. 2.) The upper end of this lever is engaged by a cam $E^7$, which serves to withdraw the rack $E^{10}$ and permit the rear extremity of the lever $E^5$ to raise and depress the bottle. Wound upon the spindle $e^2$ and secured at one extremity to the bracket $d^3$ and at the other to the cam $e^4$ is a spring $e^5$, which when the lever $E^8$ is retracted by a suitable spring (not illustrated) rotates the cam $e^4$ and depresses the rear end of the lever $E^5$, thus elevating the support E into contact with the bottle.

The wire-securing mechanism of our improved invention consists of a pair of shuttle-shafts arranged at an angle, and preferably a right angle, with each other and provided with a pair of shuttle or securing jaws. The shuttle-shaft $J'$ is pivotally supported and guided through a bracket $J^2$, hinged at $J^3$ to an upright bracket $J^4$ upon the table A.

$J^5$ represents a lever having one extremity pivoted at $J^6$ to a cross-bar $J^7$ between a pair of standards $A'$ and its upper end loosely connected to a collar $J^8$, firmly secured to the shuttle-shaft. A pin $J^9$ projects inwardly from the central portion of the lever $J^5$ and is guided in a camway $J^{10}$ of the cam $J^{11}$, which cam is mounted on a diagonally-extending shaft $J^{12}$, having motion communicated thereto from the lower shaft $B^2$ by gears $J^{13}$ and $J^{14}$, Figs. 2 and 3. It will thus be seen that as the cam $J^{11}$ is rotated the shuttle is forced toward and away from the bottle to secure the wire thereto with its extremities projecting from the bottle. When forced toward the bottle, the shuttle-shaft $J'$ is preferably raised upward to elevate it above the bottle-top, as normally said shaft is beneath the top of the bottle. This elevation of the shuttle is produced by a cam $J^{15}$, secured directly to the cam $J^{11}$, previously described.

$J^{16}$ represents a bell-crank lever, which is pivoted to a standard $J^{17}$, rising from the table A, with one extremity pivoted to a loose collar $J^{18}$ upon the shuttle-shaft and the other provided with a stud $J^{19}$ for engaging a cam-way $J^{20}$ of the cam $J^{15}$. As this cam is revolved it is obvious that the shuttle is elevated and depressed.

The shuttle $j$ consists, preferably, of a spindle $j'$, tapering from its rear to its forward extremity and provided with a head or enlargement $j^2$. Pivoted to this head are jaws $j^3$, having their adjacent forward extremities normally forced together by springs $j^4$, which bear against a shoulder $j^5$ at the rear extremity of the shuttle-jaws. We preferably use two strands of wire, wind the same around the tapering spindle, as presently described, and pass them through eyes $j^6$ upon the head $j^2$, thence through openings $j^7$ in the upper part of the head, and finally through guides $j^8$ at the extremities of the shuttle-jaws.

When in their starting position, the feeding extremities of the wire project twisted together beyond the extremities of the shuttle-jaws, and after said jaws are registered with the top of the bottle, as shown in Figs. 8 and 9, they are dropped below its top by the further operation of the cam $J^{15}$, thus causing the wire to encircle the neck 2 of the bottle 1 beneath the shoulder 3. The shuttle-jaws are preferably dropped instantaneously, and as the cam $J^{11}$ then operates to withdraw the shuttle the spring-actuated jaws ride around the bottle until their forward extremities are clear, when they are immediately forced together by the springs $j^4$, thereby encircling the bottle-neck with strands of wire having their opposite extremities twisted together. The shuttle-jaws are then retracted from the bottle, and during this movement the shaft $J'$ is rotated and the strands of wire between the ends of the shuttle-jaws and the bottle are twisted together.

K represents a cam mounted on the spindle $K'$, projecting from the bracket $J^4$, to which cam motion is communicated by a gear $K^2$ on the shaft $B^2$. (See Fig. 2.) The gear $K^2$ meshes with an internal gear $K^3$, rigidly secured to the cam K. Guided in the way of the cam K is a roller $K^4$, supported at the central part of a lever $K^5$, having its lower extremity pivoted to one of the legs A' and its upper extremity provided with a pair of engaging yokes $K^6$ and $K^7$.

Rigidly secured to the shuttle-shaft $J'$ is a pair of sliding clutch-sections $K^8$ and $K^9$, having inner clutch-faces and annular grooves for receiving the studs $K^{10}$, secured to the said yokes $K^6$ and $K^7$. Loosely mounted on the shaft $J'$, between the clutch-sections $K^8$ and $K^9$, is a pair of gears $K^{11}$, constantly driven in reverse directions by the gears $K^{12}$ on the main shaft B and the intermediary $K^{13}$.

When the roller $K^4$ rests in the depression $k$ of the cam K, the lever $K^5$ is in its rearward position and the forward clutch-section $K^9$ is locked with the forward gear $K^{11}$, whereupon the shuttle-shaft rotates in the direction of the arrow 10. (Shown at Fig. 10.) On the contrary, when the stud $K^4$ rides on the elevation $k'$ of the cam K the forward clutch-section $K^9$ is disengaged from the forward gear and the rear clutch-section $K^8$ is engaged with the rear gear $K^{11}$, thus rotating the shuttle-shaft in a reverse direction, as best seen in Fig. 14.

$k^2$ $k^2$ represent surfaces on the cam K, which, when engaged by the roller $K^4$, so shift the lever $K^5$ that neither the forward or rearward clutch-sections are locked with the adjacent gears.

The camway $J^{10}$ is composed of the divisions 4, 5, 6, 7, and 8, being so formed as to force the shuttle-jaws forward very quickly, to withdraw them equally quickly until clear of the bottle, to retract the jaws slowly for a short distance in order that tight twists may be formed immediately adjacent to the bottle, to then retract the shuttle-jaws more quickly for forming looser twists, and to then hold them in their rearward position and form tight twists immediately adjacent to the shuttle-jaws. These divisions of the cam $J^{10}$ of the cam $J^{11}$ are so timed in relation to the divisions $k$, $k'$, and $k^2$ of the cam K that during the forward movement of the shuttle-jaws and their retraction clear of the bottle no rotation of the shuttle-shaft takes place and that during its further rotation the shuttle-shaft is rotated to twist together the strands of wire as the retraction of the jaws feeds them out.

In order to stop the shuttle-jaws in a horizontal position, we provide a locking-bolt L, which is mounted in the bracket $J^2$ and adapted to engage a collar $L'$, keyed to the shaft $J'$. The lock L is thrown into and out of operation by a lever $L^3$, pivoted upon an of the bracket $J^4$, with one extremity pivoted to the rod L and the other extremity movable upon camways $J^{21}$ of the cam $J^{15}$. A spring $L^4$ enables the lock to yield should the lever $L^3$ force it against the periphery of the collar $L'$ before the registration therewith of the receiving-notch $L^5$, formed in said collar. It will be understood that the actuating mechanism for these shuttle-shafts is preferably identical one with the other, and that the actuating-cams are so timed in relation to each other that both shuttle-shafts operate simultaneously, and to permit this operation it will also be understood that the shuttle-jaws mounted on one shaft are adapted to lie upon the shuttle-jaws of the other when the shuttle-jaws are aligned with the top of the bottle.

As best seen in Figs. 2, 7, and 19 to 27, inclusive, the wire-feeding mechanism consists of a pair of reels M for the separate pairs of wire strands, which reels are loosely mounted on a spindle M', supported in the upright bracket F' on the frame A. Beneath the reels M is a pair of feeding-rollers $M^2$ and $M^3$, the former being tapered, adjustably supported on a spindle $M^4$, and driven by means of a belt $M^5$, which passes over a pulley $M^6$ on said spindle, an idler $M^7$ upon the bracket F', and over a pulley $M^8$ on the lower shaft $B^2$. The opposite roller $M^3$ is mounted on a lever $M^{10}$, being tightly held against the roller $M^2$ by means of a pair of rollers $M^{11}$, that bear against the opposite surface of the roller $M^2$ and are on the opposite ends of a supporting-frame $M^{12}$, which is secured by a spring $M^{13}$ to a hub $M^{14}$, mounted on the spindle $M^3$.

$M^{15}$ represents a plate in front of the roller $M^2$, through guides $M^{16}$ of which the wire passes to the rear of the roller $M^2$, thence forwardly between the rollers $M^2$ and $M^3$, through the lower guide $M^{16}$, then over the roller N, mounted on the free extremity of a take-up lever N', and finally over a roller $N^2$, supported in an arm $N^3$, mounted on the forward yoke $J^8$ of the wire-securing mechanism. The separate strands of wire are held apart and prevented from tangling by means of guides $n$ and $n^2$, which are arranged centrally with and extend beyond the rollers N and $N^2$, respectively. It will thus be understood that by the rotation of the feeding-roller $M^2$ the wire is constantly fed from the reel and by means of the rollers N and $N^2$ passes to the tapering spindle $j'$ of the wire-securing mechanism.

As the wire-shuttle is moved forward into the position shown at Fig. 8 the rotation of the spindle winds the wire thereupon; but as the shuttle is afterward withdrawn and rotated in the opposite direction the wire is fed from the spindle $j'$ through the medium of the shuttle-jaws to the bottle and the separate strands are twisted together. Meanwhile the primary feeding mechanism is continuously feeding wire and the lever N' operates or raises to take up the slack until upon the further rotation of the shuttle-shaft J' the wire is again wound on the spindle $j'$. This take-up lever is secured to the lower extremity of a pivoted support $N^4$, having its upper extremity provided with gear-teeth, which mesh with the segment $N^5$, that is journaled on a spindle $N^6$, supported on the frame F', above the spindle $M^4$. A connection $N^7$ is pivoted at one extremity to a projection of the segment and at the other to a link $N^8$, which is pivoted to a bracket $N^9$ upon the standard F'. Upon the shaft G is the cam $G^6$, which raises and lowers the pivotal pin of said connection $N^7$ and link $N^8$, thus rocking the segment and take-up lever N'. After the wire is twisted, as shown in Fig. 12, the wire-cutters (best seen at Figs. 3 and 16 to 20, inclusive) are by the cam $d^6$ actuated to sever the wire secured to the bottle from the wire-securing jaws.

As has been also previously described, the wire-securing jaws are arranged at an angle with each other, and we use two opposite pairs of cutting-jaws for operating simultaneously to cut the wire from both of the shuttles.

P represents a lever having one extremity pivoted to the upwardly-extending bracket-arm $d^3$ and the other provided with a stud $P^{12}$, movable in the camway $P^{13}$ and pivoted to one end of a connection P', the opposite end of which is flexibly connected to a cross-head $P^2$, that slides in grooves $P^3$, provided in the bracket F.

$P^4$ represents a pair of brackets rising from the portion of the main frame interposed between the two shuttle-shafts, and $P^5$ represents a rocking spindle journaled in the brackets.

$P^6$ represents a lever having one extremity loosely mounted on the spindle $P^5$ and the other connected by a link $P^7$ to a pin $P^8$ on the cross-head $P^2$, whereby when the cross-head is moved to and fro the lever $P^6$ is rocked.

$P^9$ and $P^{10}$ represent a pair of levers loosely mounted on the spindle $P^5$ and held apart by a spring $P^{11}$, as best seen at Figs. 16 and 17.

The cutting-jaws $p$ and $p'$ are preferably so arranged that one is stationary and the other movable, with their respective cutting-edges $p^2$ and $p^3$ shearing one by the other, the stationary jaw $p$ being secured at $p^4$ to the lever $P^9$ and the movable jaw being pivoted at $p^5$ to the stationary jaw and provided with an elongated recess $p^6$ for receiving the end of the lever $P^{10}$. As the cross-head $P^2$ moves forward to its dotted position (shown at Fig. 16) the link $P^7$ rocks the lever $P^6$, and an upwardly-extending shoulder $p^8$ thereon contacts with the lever $P^{10}$, whereupon by means of the spring $P^{11}$ forcing apart the levers $P^9$ and $P^{10}$ both cutting-jaws swing outward to the wire, which meanwhile is being twisted by the rearward movement of the shuttle-jaws. When the cross-head nears the limit of its movement, the movement of the lever $P^9$ is stopped by the abutment of its end shoulder $p^7$ with an upwardly-extending shoulder $p^9$ on the bracket $P^4$, whereupon the additional movement of the cross-head is sufficient to force the lever $P^{10}$ forward by the compression of the spring $P^{11}$, and thus swing the movable jaw $p'$ on its pivot and shear off the wire. As by the further movement of the cam $d^6$ the cross-head returns to its rearward position, a shoulder $p^{10}$ on the lever $P^6$ bears against the lever $P^9$, and thus retracts both levers into their normal position to permit further operation of the wire-securing jaws.

The wire-cutting jaws are preferably moved into operative position just before the rotation of the shuttle-shafts is stopped, and in order to facilitate the forming of tight twists immediately adjacent to the wire-securing jaws, as previously described, we prefer to use holding-jaws $p^{11}$ and $p^{12}$, which are mounted on the levers $P^9$ and $P^{10}$ in close proximity to the position of the shuttle-jaws when in their extreme rearward position. As these jaws engage the wire before the stoppage of its twisting and preferably just after the end of the rearward movement of the shuttles, tight twists are thus formed between the wire-securing jaws and holding-levers, although, as previously set forth in the wiring mechanism description, the wire interposed between the holding-jaws and the tight twists immediately next to the bottle is twisted more loosely.

The holding-jaws $p^{11}$ and $p^{12}$ are of similar construction to the cutting-jaws $p$ and $p'$, with the exception of the downwardly-extending extremity of the movable holding-jaw $p^{12}$, which is provided with a downwardly-extending shoulder or arm $p^{13}$ for bearing against the outer face of the lever $P^{10}$ and a spring $p^{14}$, pivoted to the jaw $p^{12}$ at $p^{15}$, with one extremity bearing against the inner extremity of the lever $P^{10}$ and the other against the pivotal pin $p^{16}$ of said movable holding-jaw. It will thus be seen that the spring $p^{14}$ compensates for the movement of the lever $P^{10}$ after the stoppage of the lever $P^9$ and forces the holding-jaws firmly together with a spring-pressure.

After the operation of the wire cutting and holding device it is apparent that secured to the corked bottle are strands of wire having their extremities twisted together and projecting therefrom at an angle with each other. These projecting extremities of the wire are then elevated by any suitable construction of lifting mechanism R, as shown at Figs. 1 and 3, but which it is unnecessary to further illustrate or describe, since it forms no part of our present invention, it being understood that the projecting extremities of the wire are elevated upward above the top of the bottle by any desired means. These projecting extremities of the wire are twisted together over the top of the bottle and the inserted cork by the final twisting mechanism. (Best seen at Figs. 30 and 31.) As preferably constructed this final twisting mechanism consists of a pair of revoluble jaws U, pivoted at U' to a spindle $U^2$, having one extremity mounted in the bracket $C^2$ and the other connected by gearing $U^3$ to the shaft $U^4$, which, by means of the gears $U^5$ and $i'$, is driven from the shaft B'. (See Fig. 7.) The gear $i'$ is rigidly secured to the shaft B', and in proximity to the gear $i'$ is a second loose gear $b$, which is constantly driven by the gear $b'$ on the shaft B. A suitable clutch $i^2$ (see Figs. 2 and 3) connects the normally-stationary gear $i'$ to the revoluble gear $b$, and said clutch is normally locked from operation by a suitable locking-dog $i^9$, that slides through the bracket $i^6$, pivoted to the shaft B, and a stationary bracket $i^7$ on the frame A. This lock is preferably forced into engagement with the clutch $i^2$ by a spring $i^{10}$ and is forced from operation against the action of the spring by any desirable form of cam. (Not herein illustrated.) The upper extremities of the final twisting-arms U are pivoted to one extremity of the toggle-levers $u$, the opposite extremities of which are pivoted to a collar $U^6$, that slides on the shaft $U^2$ and is engaged by one arm of a lever $U^7$, pivoted to a standard $U^8$, with its opposite arm connected by a link $U^9$ to an arm of the rocking lever $U^{10}$. The opposite end of the rocking lever $U^{10}$, as best seen in Figs. 3 and 7, is provided with a stud $U^{11}$, that moves in a camway G' of the cam $G^2$, thus communicating motion to the lever $U^7$ for raising and lowering the sleeve $U^6$. This mechanism for raising and lowering the sleeve $U^6$ and rotating the shaft $U^2$ is so timed and arranged with the preceding mechanisms that when the bottle is in position beneath the final twisting-arms the sleeve $U^6$ is already depressed and the lower extremity of the twisting-arms locked around the wire, whereupon the shaft $U^2$ revolves and twists the projecting extremities of the wire together over the top of the bottle and the inserted cork. After these extremities are twisted together the shaft B' is at rest, as previously set forth, and the sleeve $U^6$ is held in its normal position, with the twisting-arms separated.

In proximity to the final twisting mechanism is the final cutter V, (best seen at Figs. 32 to 35, inclusive,) which may be of any desirable form and construction, although it preferably consists of a pair of cutting-jaws V' and $V^2$, mounted on a spindle $V^3$, journaled in the bracket $C^2$. One of the cutting-jaws $V^2$ is pivoted to the other, and their cutting-edges are held apart by a spring $V^8$, interposed between pins or shoulders $V^9$ and $v'$ on the respective jaws V' and $V^2$.

$V^4$ represents a lever having one extremity loosely connected at $v'$ to the cutting-jaw $V^2$ and the other connected by a link $V^5$ to a spring-actuated locking-lever $V^6$, which is forced outward by a cam $V^7$ on the shaft G. The lever $V^4$ is thereby swung toward the carrier by means of the spring $V^8$, interposed between the pins $v'$ and $V^9$, and rocks the final cutting-jaws into engagement with the wire until the shoulder $V^{10}$ encounters the gage-carrying disk $c'$ and stops the jaw V' from further movement, whereupon the spring $V^8$ is compressed by the further movement of the lever $V^4$ and the cutting-jaw $V^2$ sheared by that of the jaw V'. This final cutter is designed to clip off the extreme end of the twisted wire, and thus bring them all to a uniform height, and as the bottle rotates beneath the cutter the projecting end of the wire is forced firmly upon the top of the bottle.

The operation of our invention will be readily perceived from the foregoing description and upon reference to the drawings, and it will be particularly noted that, owing to the lightness of the tapering spindle, it can be revolved with great rapidity without liability of injury or undue wrenching of the parts, as is the case with the shuttle mechanism set forth in our previous patent, No. 443,194, dated December 23, 1890, and that the wire is constantly fed out by mechanism which is entirely independent of the wire-securing jaws and that all slack of the wire is prevented by the take-up. It is evident, however, that the detail parts of our invention may be somewhat changed from that shown and described without departing from the spirit thereof. Hence we do not herein wish to limit ourselves to the precise form and construction of the detail parts.

Having thus fully described our invention, what we claim as new, and desire to secure by Letters Patent, is—

1. In a wiring-machine, the combination of a spindle for receiving strands of wire, rotating mechanism for revolving said spindle to wind thereon and unwind the desired amount of wire, and means operatively connected therewith, substantially as described, for securing these strands of wire to the bottle, substantially as and for the purpose set forth.

2. In a wiring-machine, the combination of a spindle for receiving strands of wire, rotating mechanism for revolving said spindle to wind thereon and unwind the desired amount of wire, and movable wire-securing jaws for securing the strands of wire to the bottle, substantially as and for the purpose set forth.

3. In a wiring-machine, the combination of a tapering spindle for receiving strands of wire, rotary mechanism for revolving said spindle to wind spirally thereon and to unwind the desired amount of wire, and a pair of wire-securing jaws supported by said spindle for receiving the wire from the spindle and securing it to the bottle, substantially as set forth.

4. In a wiring-machine, the combination of a reversely-revoluble spindle for receiving the strands of wire, a head at the forward extremity of the spindle, and a pair of jaws hinged to said head for receiving the wire from the spindle and feeding it to the bottle, substantially as described.

5. In a wiring-machine, the combination of a reversely-revoluble tapering spindle for receiving the strands of wire, a head at the forward extremity of the spindle, having a recess, and a pair of spring-actuated jaws mounted in said recess for receiving the wire from the spindle and securing it to the bottle, substantially as specified.

6. In a wiring-machine using two strands of wire, the combination of a guide for separating the strands, a spindle for receiving the strands, rotating mechanism for reversely revolving said spindle, and means, substantially as described, for securing the wire to the bottle, substantially as described.

7. In a wiring-machine, the combination of a reversely-revoluble shaft, a spindle carried by said shaft and constructed for winding thereon and unwinding the desired amount of wire, and movable wire-securing jaws also carried by said shaft in advance of the spindle for applying the wire to the bottles, substantially as and for the purpose described.

8. In a wiring-machine using two strands of wire, the combination of a guide for separating the strands, a spindle in proximity to the guide, rotary mechanism for revolving said spindle to wind spirally thereon and to unwind the desired amount of wire, and a pair of wire-securing jaws supported by the spindle, substantially as specified.

9. In a wiring-machine, the combination, with a reversely-revoluble shaft, of a wire-shuttle on the shaft and yielding jaws on said shuttle for securing strands of wire to the bottle, substantially as set forth.

10. In a wiring-machine using strands of wire, the combination of a guide for separating the wire, a reversely-revoluble spindle constructed for winding thereon and unwinding the desired amount of wire, and movable wire-securing jaws in proximity to said spindle for applying the wire to the bottles, substantially as and for the purpose specified.

11. In a wiring-machine, the combination, with a reversely-revoluble shaft, of a wire-shuttle on the shaft for securing strands of wire to the bottle and means, substantially as described, for moving said shuttle toward and away from the bottle, substantially as and for the purpose described.

12. In a wiring-machine, the combination, with a reversely-revoluble shaft, of a wire-shuttle on the shaft for securing strands of wire to the bottle, means, substantially as described, for moving said shuttle toward and away from the bottle and for raising and lowering the shuttle, and connected mechanism between the foregoing parts, substantially as specified.

13. In a wiring-machine, the combination, with a reversely-revoluble shaft, of a wire-shuttle on the shaft for securing strands of wire to the bottle, means, substantially as described, for moving said shuttle toward and away from the bottle and for raising and lowering the shuttle, a stop for stopping the rotation of the shaft when the shuttle is in its horizontal position, and connected mechanism between the foregoing parts, substantially as and for the purpose set forth.

14. In a wiring-machine, the combination of a reversely-revoluble shaft, a shuttle on the shaft for securing strands of wire to the bottle, and means, substantially as described, for reciprocating the shuttle toward and away from the bottle, said reciprocating mechanism being adapted to move with varying rapidity in relation to the rotation of the shaft for varying the tightness of the wire-twists, substantially as specified.

15. In a wiring-machine, the combination of a reversely-revoluble shaft, a spindle carried by said shaft and constructed for winding thereon and unwinding the desired amount of wire, wire-securing jaws also carried by said shaft for applying the wire to the bottles, and means, substantially as described, for moving said shaft toward and away from the bottle, and connected mechanism between the foregoing parts for operating them in due order, substantially as and for the purpose set forth.

16. In a wiring-machine, the combination of a reversely-revoluble shaft, a spindle carried by said shaft and constructed for winding thereon and unwinding the desired amount of wire, wire-securing jaws also carried by said shaft for applying the wire to the bottles, means, substantially as described, for moving said shaft toward and away from the bottle and for raising and lowering the shaft, and connected mechanism between the foregoing parts for operating them in due order, substantially as and for the purpose specified.

17. In a wiring-machine, the combination of a reversely-revoluble shaft, a spindle carried by said shaft and constructed for winding thereon and unwinding the desired amount of wire, wire-securing jaws also carried by said shaft for applying the wire to the bottles, means, substantially as described, for moving said shaft toward and away from the bottle and for rotating said shaft at unequal speed during its movement toward and away from the bottle, and connected mechanism between the foregoing parts for operating them in due order, substantially as and for the purpose described.

18. In a wiring-machine, the combination of a reversely-revoluble shaft, a spindle carried by said shaft and constructed for winding thereon and unwinding the desired amount of wire, wire-securing jaws also carried by said shaft for applying the wire to the bottle, means, substantially as described, for moving said shaft toward and away from the bottle and for raising and lowering the shaft, a stop for stopping the rotation of the shaft when the jaws are in their horizontal position, and connected mechanism between the foregoing parts for operating them in due order, substantially as and for the purpose specified.

19. In a wiring-machine, the combination of a reversely-revoluble shaft, a tapering spindle carried by said shaft and constructed for winding thereon and unwinding the desired amount of wire, yielding wire-securing jaws also carried by said shaft in advance of the spindle for applying the wire to the bottle, means, substantially as described, for moving said shaft toward and away from the bottle for raising and lowering the shaft, and a stop for stopping the rotation of the shaft when the jaws are in their horizontal position, and connected mechanism between the foregoing parts for operating them in due order, substantially as and for the purpose described.

20. In a wiring-machine, the combination of a reversely-revoluble shaft, a spindle carried by said shaft and constructed for winding thereon and unwinding the desired amount of wire, wire-securing jaws also carried by said shaft for applying the wire to the bottle, means, substantially as described, for moving said shaft toward and away from the bottle and for rotating said shaft at unequal speed during its movement toward and away from the bottle, a stop for stopping the rotation of the shaft when the jaws are in their horizontal position and for raising and lowering the shaft, and connected mechanism between the foregoing parts for operating them in due order, substantially as and for the purpose set forth.

21. In a wiring-machine, the combination of a reversely-revoluble shaft, a shuttle supported by the shaft, a pair of gears on the shaft, and a pair of movable clutches adapted to engage said gears, substantially as and for the purpose specified.

22. In a wiring-machine, the combination of a reversely-revoluble shaft, a shuttle supported by the shaft, a pair of gears on the shaft, and a pair of movable clutches adapted to engage said gears, said clutches being so arranged in relation to the gears that both clutches may be simultaneously out of operation, substantially as and for the purpose set forth.

23. In a wiring-machine, the combination of a reversely-revoluble shaft, a shuttle supported by the shaft, a pair of gears on the shaft, a pair of movable clutches adapted to engage said gears, and a lock adapted to intermittently prevent the shaft from rotation, substantially as described.

24. In a wiring-machine, the combination of a reversely-revoluble shaft, a spindle carried by the shaft and constructed for winding thereon and unwinding the desired amount of wire, wire-securing jaws also carried by the shaft for applying the wire to the bottle, a pair of gears on the shaft, and a pair of movable clutches adapted to engage said gears, substantially as and for the purpose specified.

25. In a wiring-machine, the combination of a reversely-revoluble shaft, a spindle carried by the shaft and constructed for winding thereon and unwinding the desired amount of wire, wire-securing jaws also carried by the shaft for applying the wire to the bottle, a pair of gears on the shaft, and a pair of movable clutches adapted to engage said gears, said clutches being so arranged in relation to the gears that both clutches may be simultaneously out of operation, substantially as set forth.

26. In a wiring-machine, the combination of a reversely-revoluble shaft, a spindle carried by the shaft and constructed for winding thereon and unwinding the desired amount of wire, wire-securing jaws also carried by the shaft for applying the wire to the bottle, a pair of gears on the shaft, a pair of movable clutches adapted to engage said gears, and a lock adapted to intermittently prevent the shaft from rotation, substantially as described.

27. In a wiring-machine, the combination of a pair of spindles arranged at an angle with each other and constructed for winding the wire upon and unwinding it from their peripheries, wire-securing means, substantially as described, for receiving the strands of wire from the spindles and securing them to the bottle, and connected mechanism between the foregoing parts, substantially as described.

28. In a wiring-machine, the combination of a pair of reversely-revoluble spindles arranged at an angle with each other and constructed for winding the wire upon and unwinding it from their peripheries, wire-securing means, substantially as described, for receiving the strands of wire from the spindles and securing them to the bottle with their extremities projecting therefrom at an angle with each other, and connected mechanism between the foregoing parts, substantially as set forth.

29. In a wiring-machine, the combination of a pair of reversely-revoluble spindles arranged at an angle with each other and constructed for winding the wire upon and unwinding it from their peripheries, wire-securing means, substantially as described, for receiving the strands of wire from the spindles and securing them to the bottle, and means, substantially as described, for moving the spindles toward and away from the bottles, substantially as described.

30. In a wiring-machine, the combination of a pair of spindles arranged at an angle with each other and constructed for winding the wire upon and unwinding it from their peripheries, wire-securing means, substantially as described, for receiving the strands of wire from the spindles and securing them to the bottle, for passing the wire over the top of the bottle and the inserted cork, and for securing the wire in said position, and connected mechanism between the foregoing parts for operating them in due order, substantially as and for the purpose set forth.

31. In a wiring-machine, the combination of a pair of reversely-revoluble shafts arranged at an angle with each other, a spindle on each shaft constructed for winding thereon and unwinding the desired amount of wire, wire-securing jaws on said shafts for receiving the wire from the spindles and applying the same to the bottle, and connected mechanism between the foregoing parts for operating them in due order, substantially as described.

32. In a wiring-machine, the combination of a pair of reversely-revoluble shafts arranged at an angle with each other, a spindle on each shaft constructed for winding thereon and unwinding the desired amount of wire, wire-securing jaws on said shafts for receiving the wire from the spindles and applying the same to the bottle, means for moving the shafts toward and away from the bottles, and connected mechanism between the foregoing parts for operating them in due order, substantially as set forth.

33. In a wiring-machine, the combination of a pair of reversely-revoluble shafts arranged at an angle with each other, a spindle on each shaft constructed for winding thereon and unwinding the desired amount of wire, heads on the spindles, yielding jaws mounted on said heads for receiving the wire, wire-securing jaws on said shafts for receiving the wire from the spindles and applying the same to the bottles, and connected mechanism between the foregoing parts for operating them in due order, substantially as and for the purpose described.

34. In a wiring-machine, the combination of a pair of reversely-revoluble shafts arranged at an angle with each other, a spindle on each shaft constructed for winding thereon and unwinding the desired amount of wire, wire-securing jaws on said shafts for receiving the wire from the spindles and applying the same to the bottle, means for raising and lowering said shafts and for preventing the same from rotation, and connected mechanism between the foregoing parts for operating them in due order, substantially as and for the purpose set forth.

35. In a wiring-machine, the combination, with a wire-feeder, of a tapering spindle for receiving the strands of wire and unwinding the same therefrom, means, substantially as described, for securing the wire to the bottle, and connected mechanism between the foregoing parts, substantially as set forth.

36. In a wiring-machine, the combination, with a wire-feeder, of a reversely-revoluble spindle for receiving the strands of wire and unwinding the same therefrom, means, substantially as described, for securing the wire to the bottle, and connected mechanism between the foregoing parts, substantially as specified.

37. In a wiring-machine, the combination, with a wire-feeder, of a reversely-revoluble spindle for receiving the strands of wire and unwinding the same therefrom, means, substantially as described, for securing the wire to the bottle, and a take-up for preventing slack of the wire, and connected mechanism between the foregoing parts, substantially as set forth.

38. In a wiring-machine, the combination, with a wire-feeder, of a tapering spindle for receiving the strands of wire and unwinding the same therefrom, means, substantially as described, for securing the wire to the bottle, a guide for separating the strands of wire, and connected mechanism between the foregoing parts, substantially as set forth.

39. In a wiring-machine, the combination, with a wire-feeder, of a spindle for receiving strands of wire, mechanism for rotating the spindle to wind thereon and unwind the desired amount of wire for stopping the rotation of the spindle and for securing the wire to the bottle, and connected mechanism between the foregoing parts for operating them in due order, substantially as set forth.

40. The combination, with a wire-feeder, of a pair of spindles arranged at an angle with each other and constructed for winding the wire upon and unwinding it from their peripheries, wire-securing means, substantially as described, for receiving the strands of wire from the spindles and securing them to the bottle, and connected mechanism between the foregoing parts, substantially as described.

41. The combination, with a wire-feeder, of a pair of reversely-revoluble shafts arranged at an angle with each other, a spindle on each shaft constructed for winding thereon and unwinding the desired amount of wire, wire-securing jaws supported on said shafts for receiving the wire from the spindles and applying the same to the bottle, and connected mechanism between the foregoing parts for operating them in due order, substantially as set forth.

42. In a wiring-machine, the combination of a pair of reversely-revoluble spindles arranged at an angle with each other and constructed for winding the wire and unwinding it from their peripheries, a pair of wire-feeders for feeding wire to the respective spindles, movable jaws for receiving the wire from the spindles and securing the same to the bottle, and connected mechanism between the foregoing parts for operating them in due order, substantially as specified.

43. In a wiring-machine, the combination of a wire-feeder, wire-securing jaws for securing the wire and applying it to the bottle, mechanism for moving the wire-securing jaws toward and away from the bottle, a take-up for preventing the slack of the wire, connecting mechanism between the wire-feeder and take-up for operating both conjointly, and connected mechanism between the foregoing parts for operating them in due order, substantially as described.

44. In a wiring-machine, the combination of a wire-feeder, wire-securing jaws for securing the wire and applying it to the bottle, mechanism for removing the wire-securing jaws toward and away from the bottle, a take-up for preventing the slack of the wire, connecting mechanism between the wire-feeder and take-up for operating both conjointly, a guide on the take-up lever for separating the wires, and connected mechanism between the foregoing parts for operating them in due order, substantially as specified.

45. In a wiring-machine, the combination of a wire-feeder, a spindle for receiving the strands of wire and unwinding the same therefrom, means, substantially as described, for securing the wire to the bottle, a take-up for preventing slack of the wire, connected mechanism between the wire-feeder and take-up for operating both conjointly, and connected mechanism between the foregoing parts for operating them in due order, substantially as set forth.

46. In a wiring-machine, the combination of a wire-feeder, a spindle for receiving the strands of wire and unwinding the same therefrom, a guide in proximity to the spindle for separating the strands, jaws for receiving the wire from the spindle and applying it to the bottle, a take-up preventing slack of the wire, and a guide in proximity to the take-up lever for separating the strands, substantially as and for the purpose described.

47. In a wiring-machine, the combination of a continuously-operating feeder, a reciprocating spindle for receiving the strands of wire and unwinding the same therefrom, wire-securing mechanism, substantially as described, for securing the wire to the bottle, and connected mechanism between the foregoing parts, substantially as specified.

48. In a wiring-machine, the combination of a continuously-operating feeder, a reciprocating spindle for receiving the strands of wire and unwinding the same therefrom, wire-securing mechanism, substantially as described, for securing the wire to the bottle, a take-up for preventing slack of the wire, and connected mechanism between the foregoing parts, substantially as described.

49. In a wiring-machine, the combination of a continuously-operating feeder, a reciprocating reversely-revoluble spindle for receiving the strands of wire and unwinding the same therefrom, wire-securing mechanism, substantially as described, for securing the wire to the bottle, a take-up for preventing slack of the wire, a guide between the feeder and spindle, and connected mechanism between the foregoing parts, substantially as and for the purpose set forth.

50. In a wiring-machine, the combination of a feeder for feeding two strands of wire, a reciprocating spindle for receiving strands of wire and unwinding the same therefrom, a guide for separating the wire, wire-securing means for securing the strands of wire to the bottle, and connected mechanism between the foregoing parts, substantially as and for the purpose described.

51. In a wiring-machine, the combination, with a wire-feeder, of a pair of reversely-revoluble spindles arranged at an angle with each other for winding the wire upon and unwinding it from their peripheries, wire-securing means, substantially as described, for receiving the strands of wire from the spindles and securing them to the bottle, and connected mechanism between the foregoing parts, substantially as described.

52. In a wiring-machine, the combination, with a wire-feeder, of a pair of reversely-revoluble spindles arranged at an angle with each other for winding the wire upon and unwinding it from their peripheries, take-ups for preventing slack of the wire, wire-securing means, substantially as described, for receiving the strands of wire from the spindles and securing them to the bottle, and connected mechanism between the foregoing parts, substantially as specified.

53. In a wiring-machine, the combination, with a wire-feeder, of a pair of spindles arranged at an angle with each other for receiving the strands of wire and unwinding the same therefrom, jaws for receiving the wire from the spindles and applying it to the bottles, a pair of movable levers having their extremities interposed between the feeder and the spindles for supporting the wire and taking up the slack thereof, and connected mechanism between the foregoing parts for operating them in due order, substantially as and for the purpose specified.

54. In a wiring-machine, the combination of a wire-feeder, a revoluble spindle for receiving the strands of wire and unwinding the same therefrom, a take-up lever having one end mounted at one side of the spindle and engaged with the wire between said spindle and feeder, means for reciprocating the lever toward the spindle, and connected mechanism between the foregoing parts for operating them in due order, substantially as and for the purpose set forth.

55. The combination, with mechanism for receiving and applying the wire to the bottle, of a feeding-roller having a conical peripheral face for engaging the wire, means, substantially as described, for positively driving the feeding-roller, a spring-guide movable toward said roller for yieldingly forcing the wire against the same, and an adjuster for varying the position of the positively-driven roller to regulate the feed of the wire, substantially as and for the purpose specified.

56. The combination, with mechanism for receiving and applying the wire, of a revoluble shaft, a conical feeding-roller for the wire mounted on said shaft and movable lengthwise thereon, and an adjuster for moving the roller lengthwise on the shaft and regulating the feed of the wire, substantially as and for the purpose set forth.

57. The combination, with mechanism for receiving and applying the wire, of a longitudinally-movable tapering feeding-roller, a spring-guide bearing against said roller, and an adjuster for varying the position of the roller for regulating the feed of the wire, substantially as and for the purpose described.

58. The combination, with mechanism for receiving and applying the wire, of a revoluble shaft, a tapering feeding-roller for the wire mounted on said shaft, an adjuster for varying the position of the roller on the shaft and regulating the feed of the roller, and a guide for conducting the wire to the feeding-roller, substantially as and for the purpose set forth.

In testimony whereof we have hereunto signed our names, in the presence of two attesting witnesses, at Rochester, in the county of Monroe, in the State of New York, this 17th day of May, 1890.

SOL WILE.
HENRY LA CASSE.

Witnesses:
F. W. WHIPPLE,
FRANK M. GOFF.